(12) United States Patent
Jurik et al.

(10) Patent No.: US 10,330,293 B2
(45) Date of Patent: Jun. 25, 2019

(54) COLLIMATION AND HOMOGENIZATION SYSTEM FOR AN LED LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

(*) Notice: Subject to any disclaimer, the term of this patent is extended or adjusted under 35 U.S.C. 154(b) by 0 days.

(21) Appl. No.: 15/516,397

(22) PCT Filed: Oct. 1, 2015

(86) PCT No.: PCT/US2015/053557
§ 371 (c)(1),
(2) Date: Apr. 1, 2017

(87) PCT Pub. No.: WO2016/054410
PCT Pub. Date: Apr. 7, 2016

(65) Prior Publication Data
US 2018/0129027 A1 May 10, 2018
US 2019/0155008 A9 May 23, 2019

Related U.S. Application Data

(63) Continuation-in-part of application No. 15/026,889, filed as application No. PCT/US2014/058682 on Oct. 1, 2014.

(51) Int. Cl.
G02B 19/00 (2006.01)
F21V 21/15 (2006.01)
(Continued)

(52) U.S. Cl.
CPC .............. F21V 21/15 (2013.01); F21K 9/62 (2016.08); F21S 10/007 (2013.01); F21V 5/04 (2013.01);
(Continued)

(58) Field of Classification Search
CPC ............ G02B 19/0028; G02B 19/0066; G02B 27/0927; G02B 27/0994; F21K 9/62; F21S 10/007
See application file for complete search history.

(56) References Cited

U.S. PATENT DOCUMENTS 4,037,097 A 7/1977 Stillman et al.
5,188,452 A 2/1993 Ryan
(Continued)

FOREIGN PATENT DOCUMENTS

CN 2062838 U 9/1990
CN 2589551 Y 12/2003
(Continued)

OTHER PUBLICATIONS

Office Action dated Oct. 5, 2017; U.S. Appl. No. 15/026,889, filed Apr. 1, 2016; 12 pages.
(Continued)

*Primary Examiner* — Thomas M Sember
(74) *Attorney, Agent, or Firm* — Conley Rose, P.C.; Grant Rodolph; Brooks W Taylor

(57) ABSTRACT

Disclosed is an LED light source automated luminaire with a multi-sided elongated light collimator/mixer/integrator with receiving lens and output lens both with spill shields and where the receiving spill shield is nesting in the output spill shield. The elongated integrator has a square input cross-section and a hexagon or octagon output cross section and is tapered so that the input cross section is smaller than the output cross section.

19 Claims, 23 Drawing Sheets

(51) Int. Cl.
*G02B 27/09* (2006.01)
*G02B 6/00* (2006.01)
*F21S 10/00* (2006.01)
*F21K 9/62* (2016.01)
*F21V 5/04* (2006.01)
*F21V 9/08* (2018.01)
*F21V 14/08* (2006.01)
*F21Y 115/10* (2016.01)
*F21Y 113/13* (2016.01)

(52) U.S. Cl.
CPC ............... *F21V 9/08* (2013.01); *F21V 14/08* (2013.01); *G02B 6/00* (2013.01); *G02B 19/0028* (2013.01); *G02B 19/0066* (2013.01); *G02B 27/0927* (2013.01); *G02B 27/0994* (2013.01); *F21Y 2113/13* (2016.08); *F21Y 2115/10* (2016.08)

(56) References Cited

U.S. PATENT DOCUMENTS

| | | |
|---|---|---|
| 5,227,931 A | 7/1993 | Misumi |
| 5,374,883 A | 12/1994 | Morser |
| 5,406,176 A | 4/1995 | Sugden |
| 5,764,018 A | 6/1998 | Liepe et al. |
| 5,955,855 A | 9/1999 | Van Ochten et al. |
| 6,580,244 B2 | 6/2003 | Tanaka et al. |
| 9,632,035 B2 | 4/2017 | Brukilacchio |
| 2001/0007527 A1 | 7/2001 | Lammers et al. |
| 2004/0135534 A1 | 7/2004 | Cullen |
| 2006/0176696 A1 | 8/2006 | Hough |
| 2009/0231854 A1 | 9/2009 | Junk |
| 2009/0231864 A1 | 9/2009 | Polasek |
| 2009/0323345 A1 | 12/2009 | Bomhorst |
| 2011/0063847 A1 | 3/2011 | Quadri et al. |
| 2011/0249442 A1 | 10/2011 | Jurik et al. |
| 2013/0162172 A1 | 6/2013 | Baaijens et al. |
| 2014/0025195 A1 | 1/2014 | Ahmadpour |
| 2014/0301071 A1 | 10/2014 | Jorgensen et al. |
| 2015/0230320 A1 | 8/2015 | Gritti et al. |
| 2015/0308663 A1 | 10/2015 | Jurik et al. |
| 2016/0290597 A1 | 10/2016 | Jurik et al. |
| 2016/0299489 A1 | 10/2016 | Jurik et al. |
| 2017/0016595 A1 | 1/2017 | Kubis et al. |

FOREIGN PATENT DOCUMENTS

| | | |
|---|---|---|
| CN | 1854598 A | 11/2006 |
| CN | 102959326 A | 3/2013 |
| CN | 103270437 A | 8/2013 |
| DE | 202006007227 U1 | 7/2006 |
| EP | 1710495 A1 | 10/2006 |
| EP | 2590044 A1 | 5/2013 |
| EP | 2770251 A1 | 8/2014 |
| JP | 2006162878 A | 6/2006 |
| JP | 2012084298 A | 4/2012 |
| WO | 03079532 A2 | 9/2003 |
| WO | 2012004760 A1 | 1/2012 |
| WO | 2012083957 A1 | 6/2012 |
| WO | 2014031641 A2 | 2/2014 |

OTHER PUBLICATIONS

PCT International Search Report; Application No. PCT/US2014/058682; dated Jul. 20, 2015; 5 pages.
PCT Written Opinion of the International Searching Authority; Application No. PCT/US2014/058682; dated Jul. 20, 2015; 6 pages.
PCT International Search Report; Application No. PCT/US2014/058688; dated Mar. 12, 2015; 3 pages.
PCT Written Opinion of the International Searching Authority; Application No. PCT/US2014/058688; dated Mar. 12, 2015; 6 pages.
European Examination Report; Application No. 14824174.8; dated Jan. 5, 2018; 5 pages.
PCT International Search Report; Application No. PCT/US2015/053557; dated Mar. 15, 2016; 5 pages.
PCT Written Opinion of the International Searching Authority; Application No. PCT/2015/053557; dated Mar. 15, 2016; 7 pages.
Jurik, Pavel, et al.; U.S. Appl. No. 15/516,400; filed Apr. 1, 2017; Title: An Automated Scrim System for A Luminaire; 14 pages.
PCT International Search Report, Application No. PCT/US2015/053568; dated Mar. 16, 2016; 5 pages.
PCT Written Opinion of the International Searching Authority; Application No. PCT/US2015/053568; dated Mar. 16, 2016; 6 pages.
Final Office Action dated Jun. 11, 2018; U.S. Appl. No. 15/026,889, filed Apr. 1, 2016; 36 pages.
Office Action dated Mar. 9, 2018; U.S. Appl. No. 15/125,162, filed Sep. 10, 2016; 16 pages.
Notice of Allowance dated Aug. 8, 2018; U.S. Appl. No. 15/125,162, filed Sep. 10, 2016; 23 pages.
PCT International Search Report; Application No. PCT/US2015/019746; dated Dec. 1, 2015; 4 pages.
PCT Written Opinion of the International Searching Authority; Application No. PCT/US2015/019746; dated Dec. 1, 2015; 8 pages.
Chinese Office Action; Application No. 201480065736.5; dated May 28, 2018; 13 pages.
Chinese Office Action; Application No. 201480065732.7; dated Jun. 5, 2018; 11 pages.
European Examination Report; Application No. 15825876.4; dated May 29, 2018; 5 pages.
Advisory Action dated Aug. 23, 2018; U.S. Appl. No. 15/026,889, filed Apr. 1, 2016; 3 pages.
Office Action dated Dec. 20, 2018; U.S. Appl. No. 15/026,889, filed Apr. 1, 2016; 31 pages.

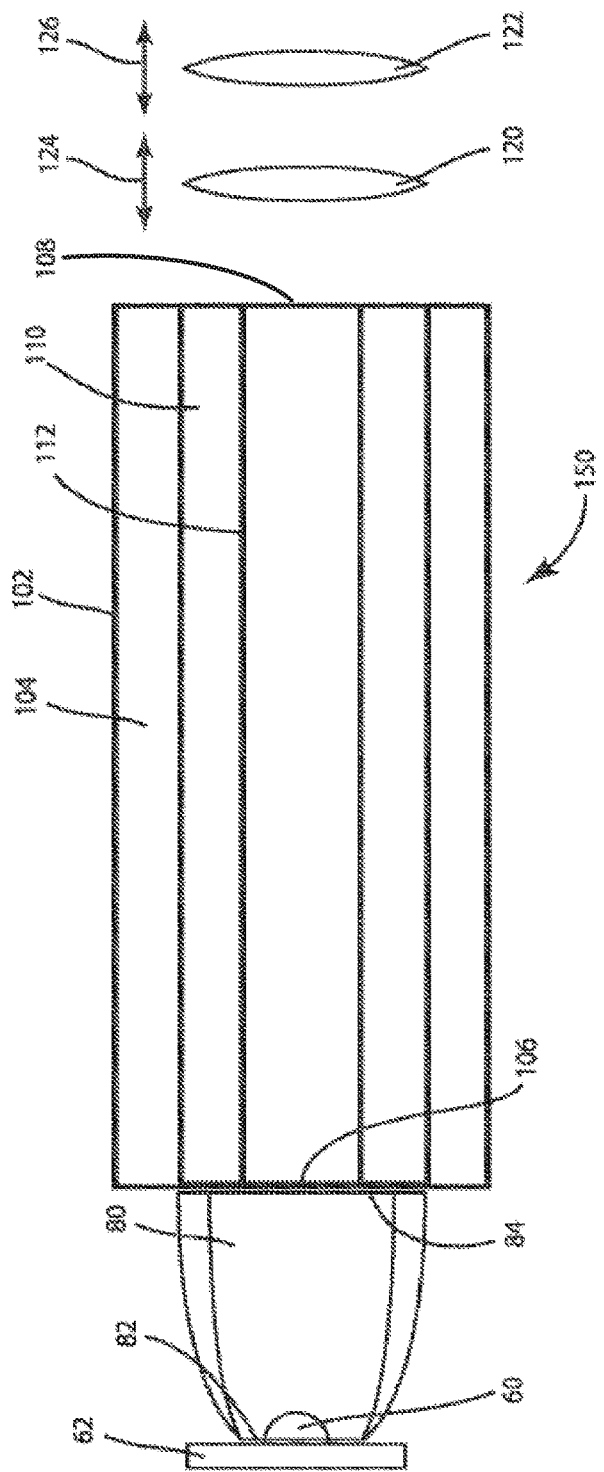

COLLIMATION AND HOMOGENIZATION SYSTEM FOR AN LED LUMINAIRE

CROSS-REFERENCE TO RELATED APPLICATIONS

This application is a U.S. National Stage of International Patent Application No. PCT/US2015/053557 filed Oct. 1, 2015 by Pavel Juřik, et al. entitled "Collimation and Homogenization System for an LED Luminaire", which claims priority of U.S. Provisional Application No. 62/058,566 filed Oct. 1, 2014 by Pavel Juřik, et al. entitled "Automated Serim System for a Luminaire".

TECHNICAL FIELD OF THE DISCLOSURE

The present disclosure generally relates to a method for controlling the light output from an array of light-emitting diodes (LEDs) when used in a light beam producing luminaire, specifically to a method relating to improving the homogenization and collimation of the LEDs and for controlling the beam angle of the array.

BACKGROUND OF THE DISCLOSURE

Luminaires with automated and remotely controllable functionality are well known in the entertainment and architectural lighting markets. Such products are commonly used in theatres, television studios, concerts, theme parks, night clubs, and other venues. A typical product will typically provide control over the pan and tilt functions of the luminaire allowing the operator to control the direction the luminaire is pointing and thus the position of the light beam on the stage or in the studio. This position control is often done via control of the luminaire's position in two orthogonal rotational axes usually referred to as pan and tilt. Many products provide control over other parameters such as the intensity, color, focus, beam size, beam shape, and beam pattern. Additionally, it is becoming common to utilize high power LEDs as the light source in such luminaires and, for color control, it is common to use an array of LEDs of different colors. For example, a common configuration is to use a mix of Red, Green, and Blue LEDs. This configuration allows the user to create the color they desire by mixing appropriate levels of the three colors. For example illuminating the Red and Green LEDs while leaving the Blue extinguished will result in an output that appears Yellow. Similarly, Red and Blue will result in Magenta and Blue and Green will result in Cyan. By judicious control of the LED controls the user may achieve any color they desire within the color gamut set by the LED colors in the array. More than three colors may also be used and it is well known to add an Amber or White LED to the Red, Green, and Blue to enhance the color mixing and improve the gamut of colors available. The products manufactured by Robe Show Lighting such as the Robin 600 LED Wash are typical of the art.

The differently colored LED dies may be arranged on packages in the luminaire such that there is physical separation between each color of LED, and this separation, coupled with differences in die size for each color, may affect the spread of the individual colors and result in inadequate mixing of the different colors along with objectionable spill light and color fringing of the combined mixed color output beam. It is common to use a lens or other optical device in front of each LED package to control the beam shape and angle of the output beam; however, these optical devices may have differing effect for different colors and color fringing or other aberrations may be visible in the output beam. It would be advantageous to have a system where stray light and aberrations are well controlled.

FIG. 1 illustrates a prior art LED lighting system showing two LEDs in a package as may be used in a luminaire. LED 2 and LED 4 may be of differing colors and, due to the different optical properties and construction of the LEDs 2 and 4 produce light beams 6 and 8 that differ in beam spread. The differing beam spreads mean that the light beams from LEDs 2 and 4 will impinge on an illuminated object 18 in such a way that areas 20 and 16 of the object 18 are illuminated by a single LED only, rather than the desired mix of both. This results in areas 20 and 16 being colored differently from the central mixed area and appearing as colored fringes. Only two (2) LEDs are illustrated in FIG. 1 for clarity and simplicity. It should be appreciated that the same problem exists with systems incorporating more than two colors of LEDs.

FIG. 2 illustrates a typical multiparameter automated LED luminaire system 10. These systems commonly include a plurality of multiparameter automated luminaires 12 which typically each contain on-board an array of LEDs, and electric motors coupled to mechanical drive systems and control electronics (not shown). In addition to being connected to mains power either directly or through a power distribution system (not shown), each luminaire is connected is series or in parallel to data link 14 to one or more control desk(s) 15. The automated LED luminaire system 10 is typically controlled by an operator through the control desk 15. Consequently, to affect this control, both the control desk 10 and the individual luminaires typically include electronic circuitry as part of the electromechanical control system for controlling the automated lighting parameters.

FIG. 3 and FIG. 4 illustrate an optical system used in the prior art to provide a variable beam angle or zoom to an automated LED luminaire. Each LED 50 which may be fitted with a primary optic 52 has an associated pair of lenses 53 and 55. Lenses 53 and 55 may be separate lenses or each part of an array of lenses covering the entire LED array. Lenses 53 and 55 may each comprise a single optical element 56 and 57 respectively. In operation at least one of lens 53 or lens 55 is stationary with respect to LED 50 while the other may move along optical axis 59. In the example illustrated in FIGS. 3 and 4 lens 55 is fixed relative to LED 50 while lens 53 is able to move along optical axis 59. FIG. 3 shows lens 53 in a first position and FIG. 4 shows lens 53 in a second position closer to LED 50. This varying relative position between LED 50, lens 53 and lens 55 provides a beam angle or zoom to the light beam from LED 50. Such systems are often limited in their zoom range by optical problems caused by the color separation and inadequate beam homogenization. They may further be limited by requiring large movements of the lenses.

There is a need for an optical system for an LED automated luminaire which provides improved color homogenization and beam collimation while also providing improved zoom range.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein:

FIG. 8 illustrates an optical system that is a further embodiment of the disclosure;

DETAILED DESCRIPTION OF THE DISCLOSURE

Preferred embodiments of the present disclosure are illustrated in the FIGUREs, like numerals being used to refer to like and corresponding parts of the various drawings.

The present disclosure generally relates to a method for controlling the light output from an array of LEDs when used in a light beam producing luminaire, specifically to a method relating to improving the homogenization and collimation of the LEDs and for controlling the beam angle of the array.

Figure 1:
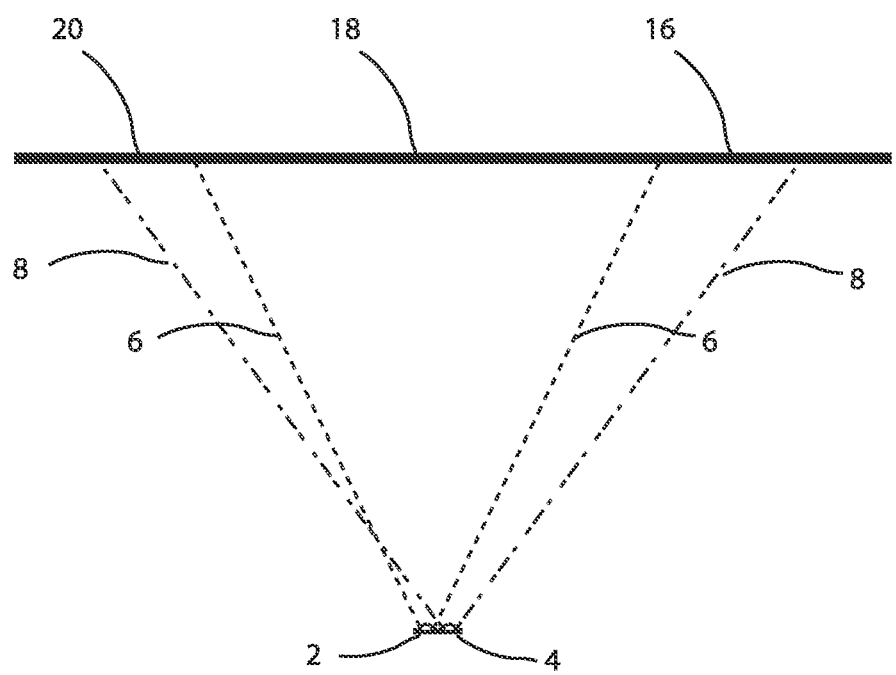
FIG. 1 illustrates a prior art LED lighting system.
Figure 2:
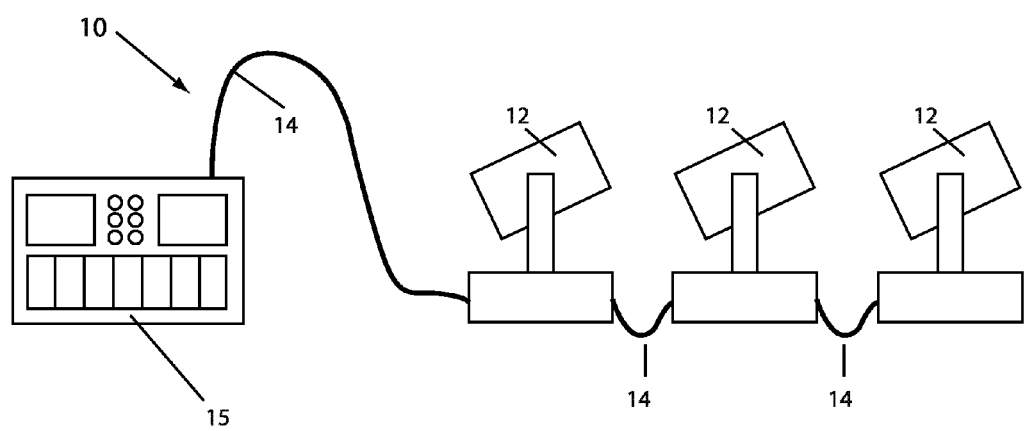
FIG. 2 illustrates a typical multiparameter automated LED luminaire system.
Figure 3:
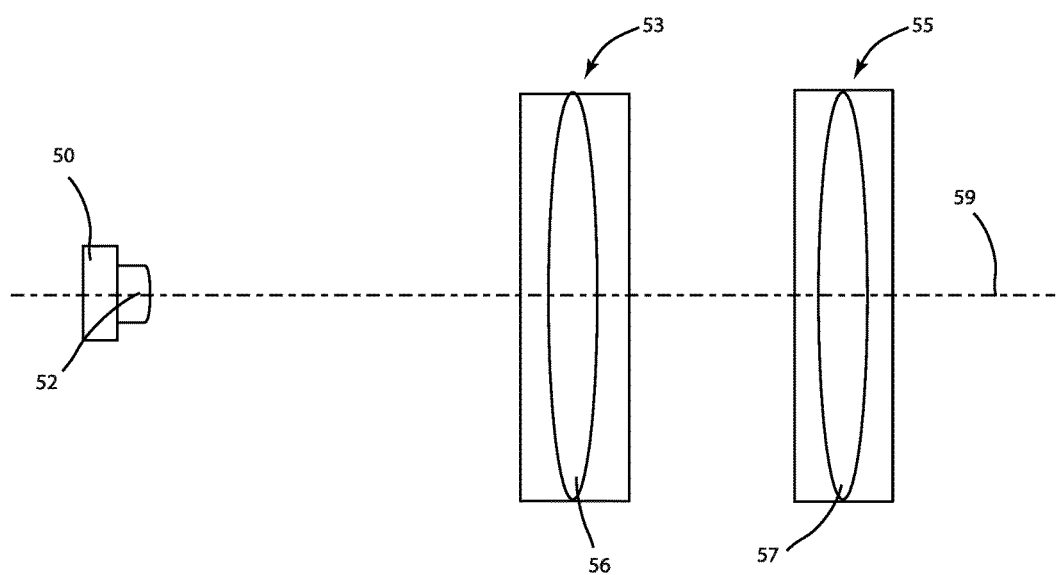
FIG. 3 illustrates an optical system of a prior art LED luminaire.
Figure 4:
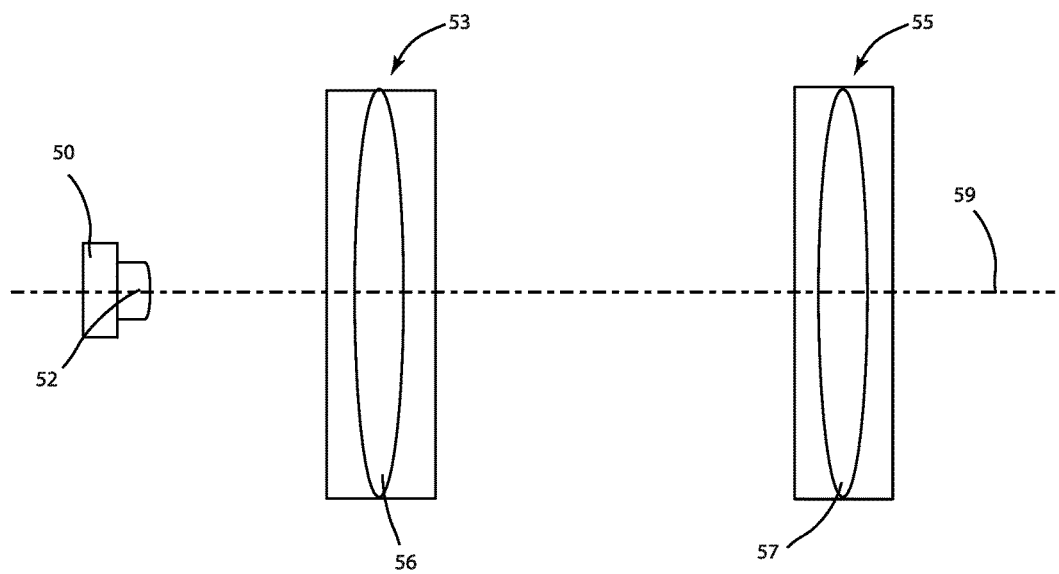
FIG. 4 illustrates an optical system of a prior art LED luminaire.
Figure 5:
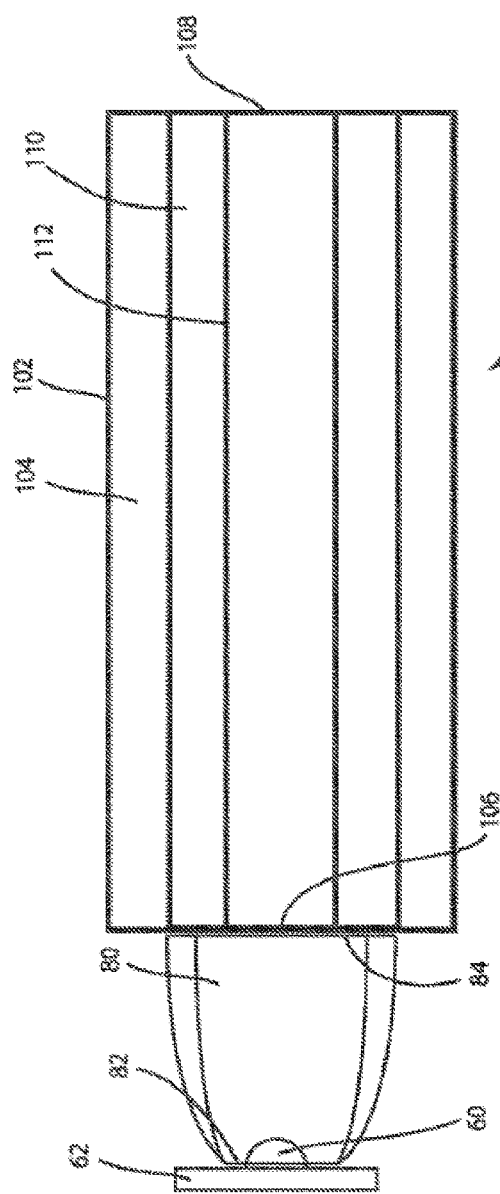
FIG. 5 illustrates an embodiment of the optical system of the disclosure.
Figure 6:
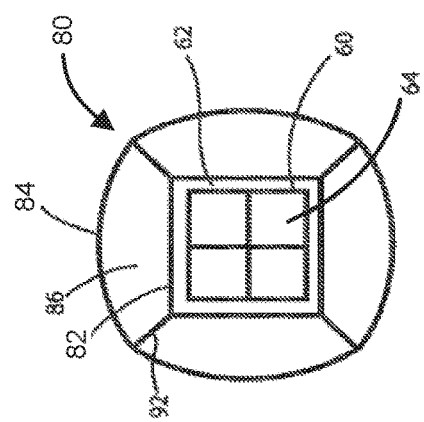
FIG. 6 illustrates an end view of the collimating and mixing optic and LED of FIG. 5.

Referring now to FIGS. 5 and 6. FIG. 5 illustrates an embodiment of an optical system 100 of the disclosure. LED 60, which may include a primary optic, is mounted on substrate 62. LED 60 may contain a single color die or may contain multiple dies, each of which may be of differing colors. The light output from the dies in LED 60 enters collimating and mixing optic 80 at light entry port 82. Collimating and mixing optic 80 may be a solid optic using total internal reflection (TIR) to direct the light or may be a hollow reflective surface. Collimating and mixing optic 80 may have four sides 86, each of which may be curved with cornered sides 92. The end view of collimating and mixing optic 80 in FIG. 6 combined with the side illustration of the collimating and mixing optic 80 in FIG. 5 illustrate details of an embodiment of the shape. The combination square sided shape with curved sides provides excellent mixing of the light from the dies 64 in LED 60. A further feature of collimating and mixing optic 80 is that it directs the reflected light to an external focal point which is comparatively close to its output port 84 of the collimating and mixing optic 80.

Figure 10:
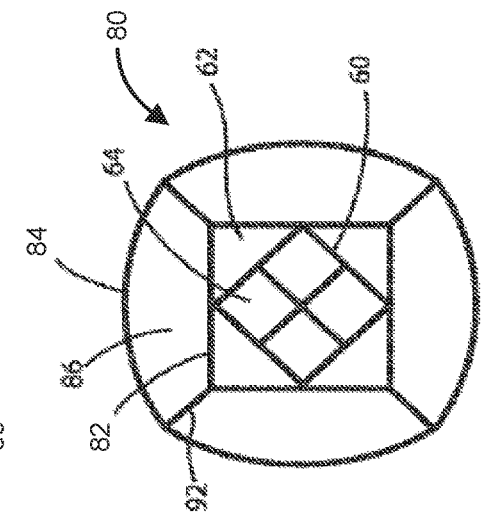
FIG. 10 illustrates an end view of the collimating and mixing optic of FIG. 9.

In the embodiments illustrated in FIG. 6 the configuration of the plurality of LED dies 64 in LED 60 is square and aligned with the sides 86 of the collimating and mixing optic 80. In other embodiments the alignment of the dies 64 with the sides 86 of collimating and mixing optic 80 may not be aligned, for example as illustrated in FIG. 10. In alternative embodiments of those illustrated in FIG. 6 and FIG. 10 the collimator may have three, four, or more sides. In further embodiments the arrangement of the dies 64 in the LED array may be configured in different shapes and paired with collimators with matching or divergent shapes.

In different embodiments degree of curvature of the sides 86 may vary—flatter for some configurations and more curved for other configurations. Additionally, the sharpness of the cornered sides 92 between the sides 86 may vary among different collimators—sharper for some configurations and rounder for others. The selection of the number of sides and the curvature of the sides and curvature of the corners is/are tradeoffs between the degree of mixing desired and acceptable light loss for a particular configuration or application.

Figure 7:
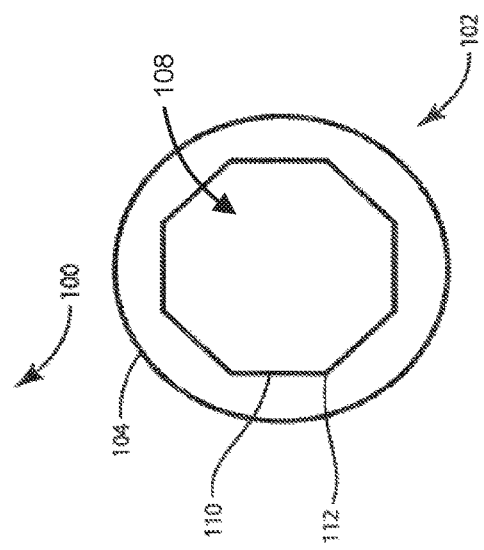
FIG. 7 illustrates a front exit port view of the light integrator of FIG. 5.

In the embodiment shown in FIG. 5, the reflected light exits collimating and mixing optic 80 at output port 84 and enters light integrator optic 102 at its entry port 106. Light integrator optic 102 is a device utilizing internal reflection so as to collect, homogenize and constrain, and conduct the light from collimating and mixing optic 80. Light integrator optic 102 may be a hollow tube with a reflective inner surface such that light impinging into the entry port 106 may be reflected multiple times along the tube before leaving at the exit port 108. Light integrator optic 102 may be a square tube, a hexagonal tube, a heptagonal tube, an octagonal tube, a circular tube, or a tube of any other cross section. In a further embodiment light integrator optic 102 may be a solid rod constructed of glass, transparent plastic, or other optically transparent material where the reflection of the incident light beam within the rod is due to total internal reflection (TIR) from the interface between the material of the rod and the surrounding air. The integrating rod may be a square rod, a hexagonal rod, a heptagonal rod, an octagonal rod, a circular rod, or a rod of any other cross section. Embodiments of light integrator optics according to the disclosure with a polygonal cross section have reflective sides 110 and corners 112 between the reflective sides as seen in FIG. 5, which includes a side cross sectional view of the light integrator optic 102 and more easily seen in FIG. 7, a front exit port 108 view of the light integrator optic 102.

In a yet further embodiment, the light integrator optic 102 may have a straight sided square cross section at the entry port 106 and a straight sided polygonal cross section with more than four sides at the exit port 108. The exit port 108 may be pentagonal, hexagonal, heptagonal, octagonal, or have any other integral number of sides.

A feature of a light integrator optic 102, which comprises a hollow or tube or solid rod where the sides of the rod or tube are essentially parallel and the entry port 106 and exit port 108 are of the same size, is the divergence angle of light exiting the light integrator optic 102 at exit port 108 will be the same as the divergence angle for light entering the light integrator optic 102 at entry port 106. Thus, a parallel sided light integrator optic 102 has no effect on the beam divergence and will transfer the position of the focal point of collimating and mixing optic 80 at its output port 84 to the light integrator optic's 102 exit port 108. The light exiting light integrator optic 102 will be well homogenized with all the colors of LED 60 mixed together into a single colored light beam and may be used as our output, or may be further modified by downstream optical systems.

Light integrator optic 102 may advantageously have an aspect ratio where its length is much greater than its diameter. The greater the ratio between length and diameter, the better the resultant mixing and homogenization will be. Light integrator optic 102 may be enclosed in a tube or protective sleeve 104 which provides mechanical protection against damage, scratches, and dust.

FIG. 8 illustrates an optical system 150 that is a further embodiment of the disclosure. Elements LED 60, substrate 62, collimating and mixing optic 80, light integrator optic 102, are as described above for FIG. 5, FIG. 6, and FIG. 7. In this embodiment, the homogenized and focused light exiting from light integrator optic 102 is directed through a lens system comprising lenses 120 and 122. Lenses 120 and 122 may be independently movable as shown by arrows 124 and 126 along the optical axis so as to provide beam angle control over the light beam. Because the focal point of collimating and mixing optic 80 is short, a small motion of lenses 120 and 122 may cause a large change in beam angle. In one embodiment movements of 10 mm in the position of lenses 120 and/or 122 may cause a change in beam angle from 5° to 50°. Thus providing an improved variable beam angle or zoom to an automated LED luminaire.

In further embodiments, lenses 120 and 122 may form an achromatic optical system such that it provides the same degree of beam angle change to long wavelength red light as it does to short wavelength blue light and thus avoids chromatic aberration. This ensures that the beams from the different colors of LED dies 64 in LED 60 are all the same size resulting in a uniformly colored combined beam. In yet further embodiments, any number of lenses may be used as the lens system. In all cases, lenses may contain one or more optical elements. Lenses 120 and 122 are illustrated herein as bi-convex lenses however the disclosure is not so limited and lenses 120 and 122 may be any shaped optical element as well known in the art.

Figure 9:
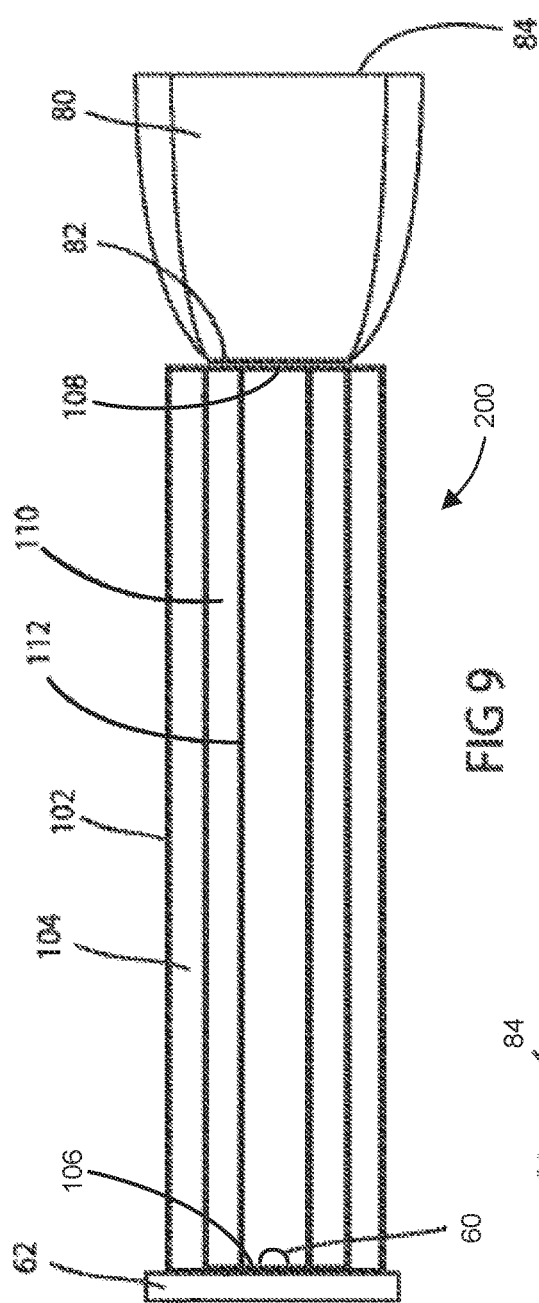
FIG. 9 illustrates an alternative embodiment of an optical system of the disclosure.
Figure 11:
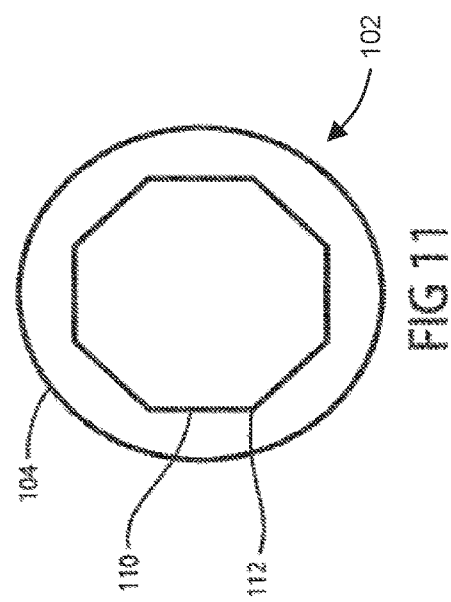
FIG. 11 illustrates a front view of the light integrator of FIG. 9.

Referring now to FIGS 9-11. FIG. 9 illustrates an alternative embodiment of an optical system 200 of the disclosure. LED 60, which may include a primary optic, is mounted on substrate 62. LED 60 may contain a single color die 64 or may contain multiple dies 64, each of which may be of differing colors. The light output from the dies 64 in LED 60 enters light integrator optic 102 at entry port 106. Light integrator optic 102 may be of the same construction and configuration as in the embodiment illustrated in FIG. 5. Light integrator optic 102 is a device utilizing internal reflection so as to collect, homogenize and constrain, and conduct the light to the entry port 82 of collimating and mixing optic 80. Light integrator optic 102 may be a hollow tube with a reflective inner surface such that light impinging into the entry port 106 may be reflected multiple times along the tube before leaving at the exit port 108. Light integrator optic 102 may be a square tube, a hexagonal tube, a heptagonal tube, an octagonal tube, a circular tube, or a tube of any other cross section. In a further embodiment light integrator optic 102 may be a solid rod constructed of glass, transparent plastic, or other optically transparent material where the reflection of the incident light beam within the rod is due to total internal reflection (TIR) from the interface between the material of the rod and the surrounding air. The integrating rod may a square rod, a hexagonal rod, a heptagonal rod, an octagonal rod, a circular rod, or a rod of any other cross section. FIG. 11 illustrates a front view of the light integrator of FIG. 9.

A feature of a light integrator optic 102 which comprises a hollow or tube or solid rod where the sides of the rod or tube are essentially parallel and the entry port 106 and exit port 108 are of the same size is that the divergence angle of light exiting the light integrator optic 102 at exit port 108 will be the same as the divergence angle for light entering the light integrator optic 102 at entry port 106 from LED 60. Thus a parallel sided light integrator optic 102 has no effect on the beam divergence and will transfer the light from LED 60 to its exit aperture 108. The light exiting light integrator optic 102 will be well homogenized with all the colors of LED 60 mixed together into a single colored light beam.

Light integrator optic 102 may advantageously have an aspect ratio where its length is much greater than its diameter. The greater the ratio between length and diameter, the better the resultant mixing and homogenization will be. Light integrator optic 102 may be enclosed in a tube or protective sleeve 104 which provides mechanical protection against damage, scratches, and dust.

Light exiting light integrator optic 102 at exit port 108 enters collimating and mixing optic 80 at its entry port 82. Collimating and mixing optic 80 may be of the same construction and configuration as the collimating and mixing optic in the embodiment illustrated in FIG. 5. Collimating and mixing optic 80 may be a solid optic using total internal reflection (TIR) to direct the light or may be a hollow reflective surface. Collimating and mixing optic 80 may have four sides, each of which may be curved. The side view of collimating and mixing optic 80 included in FIG. 9 and the end view of collimating and mixing optic 80 in FIG.

10 illustrate the detail of this shape. The combination square sided shape with curved sides provides further mixing of the light from the dies 64 in LED 60 as homogenized by light integrator optic 102. A further feature of collimating and mixing optic 80 is that it directs the reflected light to an external focal point which is comparatively close to its output port 84.

In the embodiment shown in FIG. 9 the reflected light exits collimating and mixing optic 80 at output port 84 and may be used as our output, or may be further modified by downstream optical systems.

Figure 12:
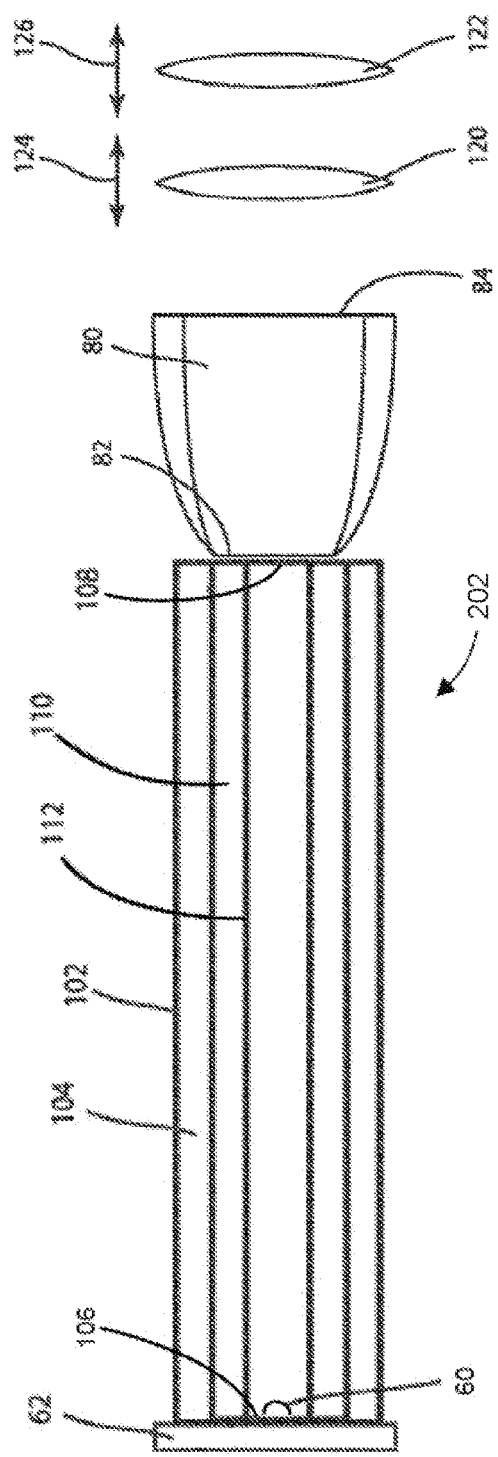
FIG. 12 illustrates an optical system that is a further embodiment of the disclosure.

FIG. 12 illustrates an optical system 202 that is a further embodiment of the disclosure. Elements LED 60, substrate 62, collimating and mixing optic 80, light integrator optic 102, can be as described above. In this embodiment the homogenized and focused light exiting from collimating and mixing optic 80 is directed through a lens system comprising lenses 120 and 122. Lenses 120 and 122 may be independently movable along the optical axis so as to provide beam angle control over the exiting light beam. Because the focal point of collimating and mixing optic 80 is short, a small motion of lenses 120 and 122 may cause a large change in beam angle. In one embodiment a movement of 10 mm in the position of lenses 120 and/or 122 may cause a change in beam angle from 5° to 50°. Thus providing an improved variable beam angle or zoom to an automated LED luminaire.

Figure 13:
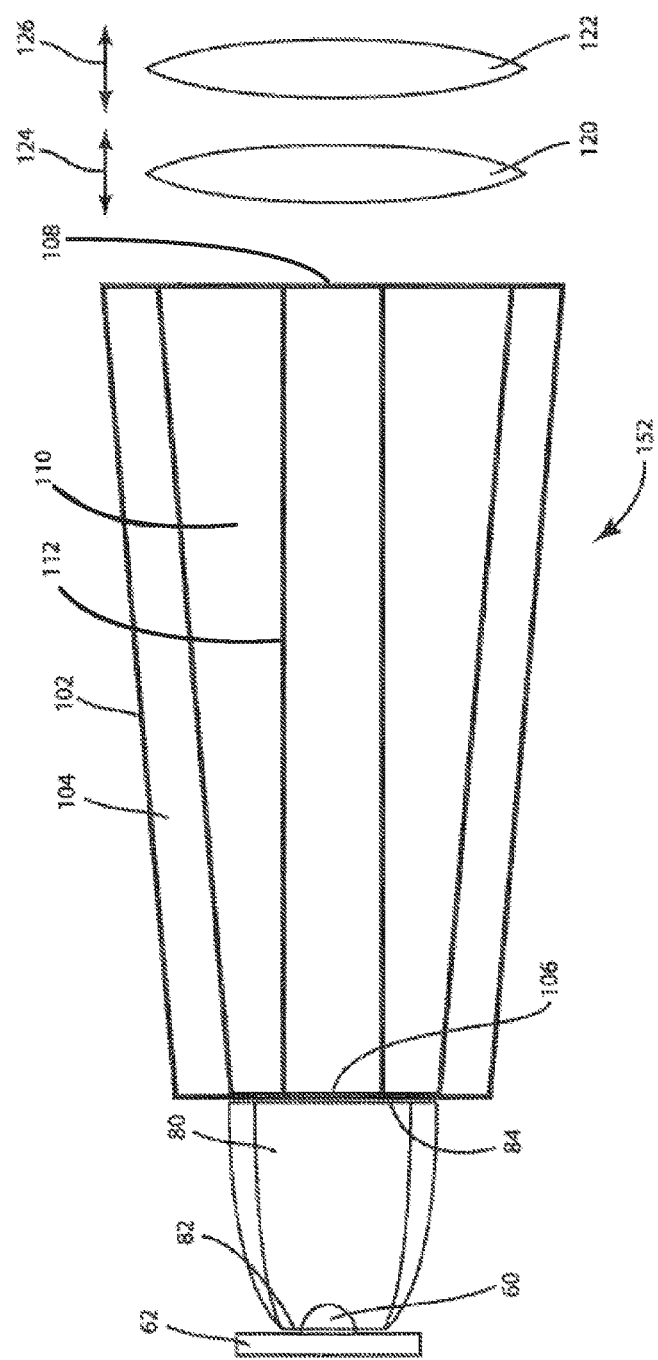
FIG. 13 illustrates an optical system that is a further alternative embodiment of an LED luminaire according to the disclosure.
Figure 14:
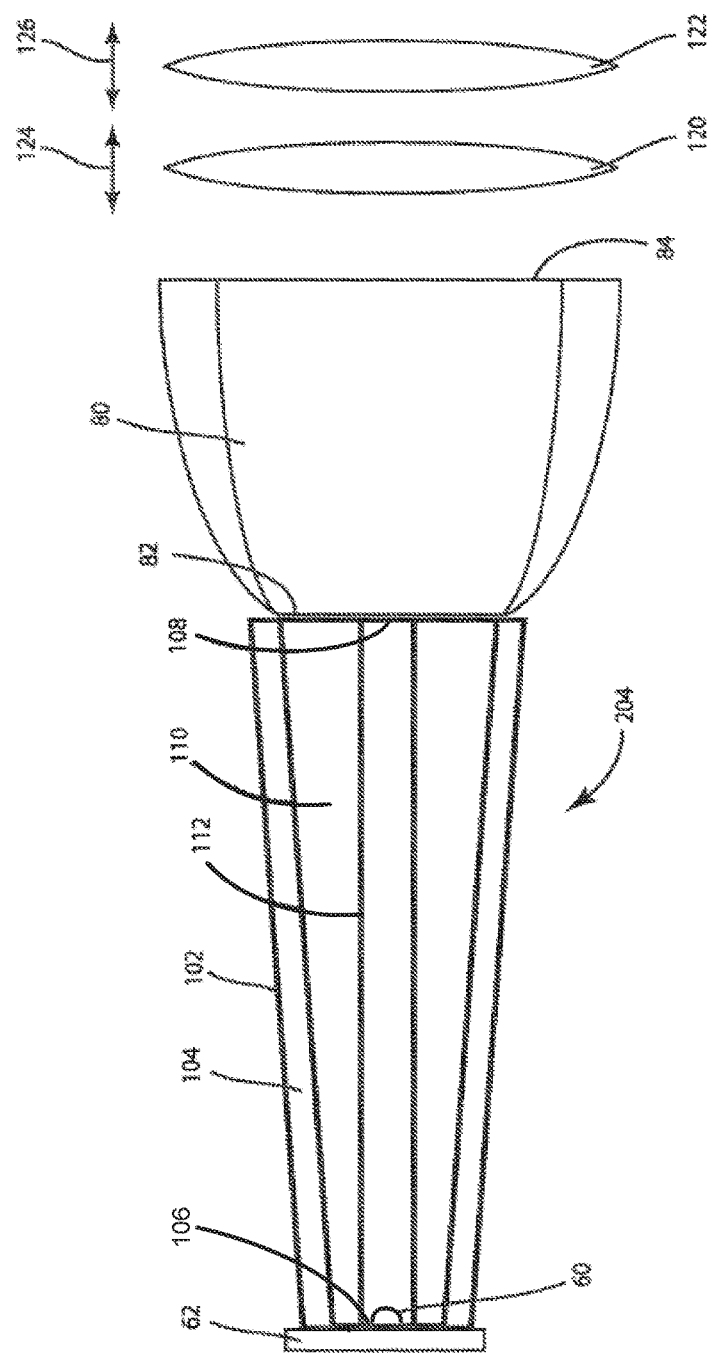
FIG. 14 illustrates an optical system that is a further alternative embodiment of an LED luminaire according to the disclosure.

In further embodiments, lenses 120 and 122 may form an achromatic optical system such that it provides the same degree of beam angle change to long wavelength red light as it does to short wavelength blue light and thus avoids chromatic aberration. This ensures that the beams from the different colors of LED dies 64 in LED 60 are all the same size resulting in a uniformly colored combined beam. In yet further embodiments, any number of lenses may be used as the lens system. In all cases, lenses may contain one or more optical elements. Lenses 120 and 122 are illustrated herein as bi-convex lenses however the disclosure is not so limited and lenses 120 and 122 may be any shaped optical element as well known in the art and may include any number of lenses including a single lens. This applies to any of the embodiments discussed above FIG. 13 and FIG. 14 illustrate optical systems 152 and 204, respectively, that are further alternative embodiments of LED luminaires according to the disclosure. In both of these embodiments the light integrator optic 102, whether solid or hollow, has sides 110 which are tapered so that entry port 106 is smaller than the exit port 108. The advantage of this structure is that the divergence angle of light exiting the light integrator optic 102 at exit port 108 will be smaller than the divergence angle for light entering the light integrator optic 102 at entry port 106. The combination of a smaller divergence angle from a larger aperture serves to conserve the etendue of the system. Thus the tapered light integrator optic 102 may provide similar functionality to a condensing optical system. Therefore some embodiments may not include lenses 120 and 122 as discussed above while other embodiments may include such elements as discussed above with regard to embodiments with non-tapered integrators.

Figure 15:
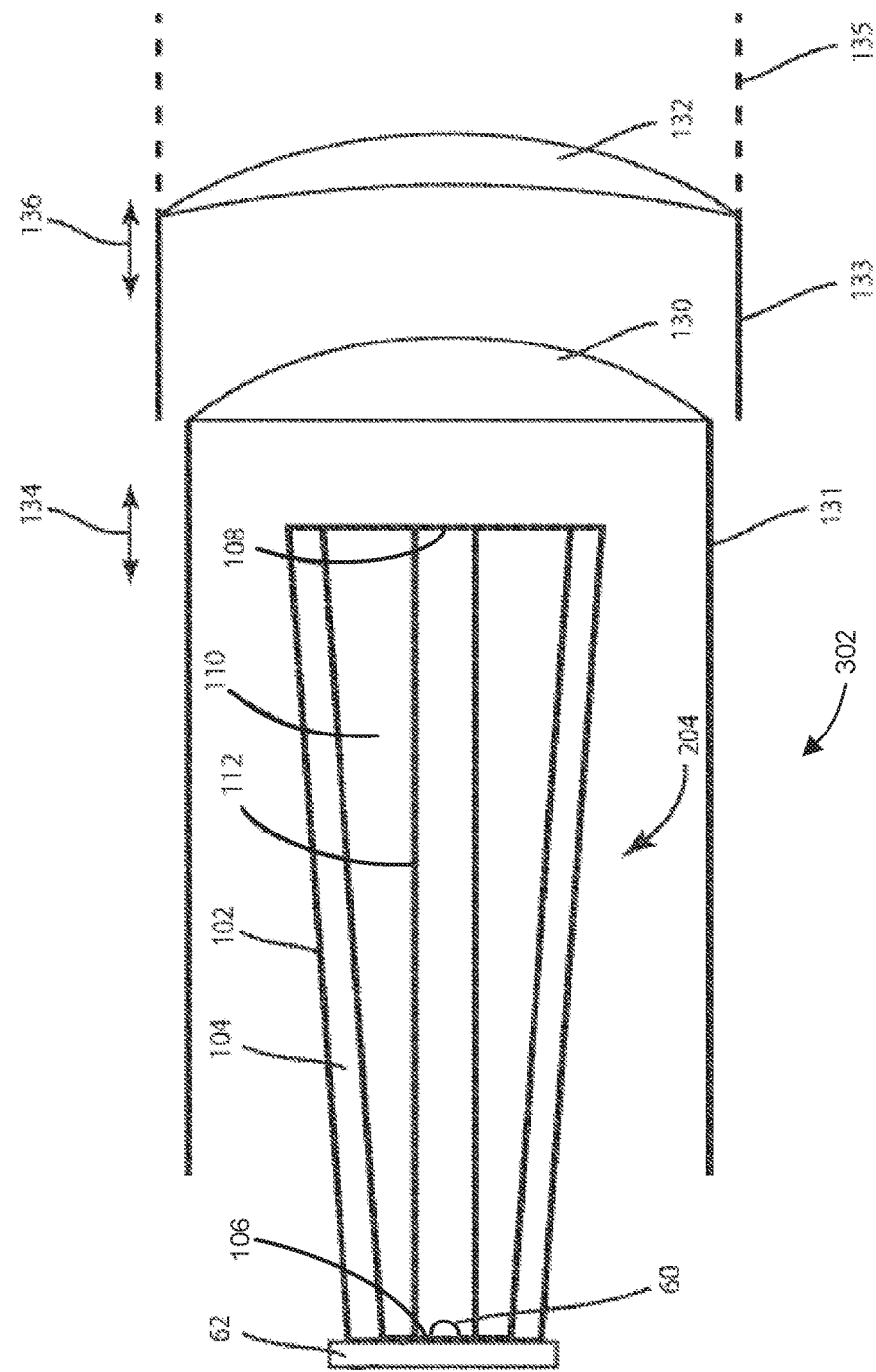
FIG. 15 illustrates an alternative embodiment a portion of an LED luminaire according to the disclosure with a light spill reducing element.

FIG. 15 illustrates a further alternative embodiment of a portion of an LED luminaire with the optical system 204, having a light spill reducing element. In this embodiment the light integrator optic 102, whether solid or hollow, and with any number of sides, or with a square entry port 106 and a polygonal exit port 108 has sides 110 which are tapered so that entry port 106 is smaller than the exit port 108. The advantage of this structure is that the divergence angle of light exiting the light integrator optic 102 at exit port 108 will be smaller than the divergence angle for light entering the light integrator optic 102 at entry port 106. The combination of a smaller divergence angle from a larger aperture serves to conserve the etendue of the system. Thus a tapered light integrator optic 102 may provide similar functionality to a condensing optical system. Therefore some embodiments may not include lenses 120 and 122 as discussed above while other embodiments may include such elements as discussed above with regard to embodiments with non-tapered integrators. Additionally, this embodiment may alternately utilize lenses 130 and 132 as optical elements providing condensing, beam angle control, and focusing functionality as described above as a replacement for the collimating and mixing optic 80 used in earlier embodiments. Lenses 130 and 132 may be meniscus lenses, plano convex lenses, bi-convex lenses, or other lenses as well known in the art. In the embodiment illustrated lens 130 is a plano-convex lens, and lens 132 is a meniscus lens.

FIG. 15 also shows optional spill reducing elements 131 and 133. Spill reducing elements 131 and 133 may comprise hollow opaque thin walled tubes which are attached to, and move with, lenses 130 and 132 respectively. These tubes reduce light spill from the exit port 108 which may impinge on adjacent light integrators and their associated optical systems. Spill reducing element 131 may be of a smaller diameter than spill reducing element 133 such that lens 130 and its attached spill reducing element 131 may move within spill reducing element 133 such that lenses 130 and 132 may move to be adjacent. An external further additional spill reducing element 135 may also be added to and may move with lens 132. Lens 130 may be moved as shown by arrow 134, and lens 132 may be moved as shown by arrow 136. Such movement allows changing the focal length, and thus the beam angle of the output light beam. Lenses 130 and 132 may move together as a pair with a single actuator, or, in a further embodiment, may move independently each with its own actuator.

Figure 16:
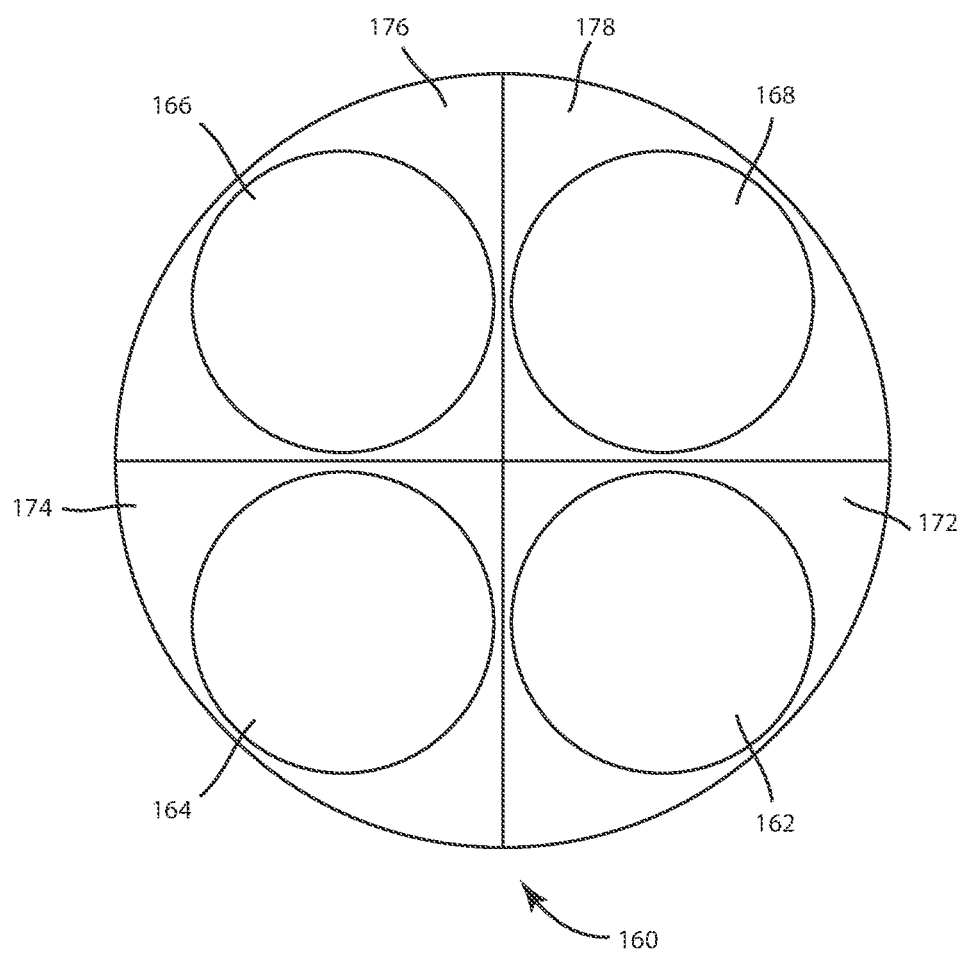
FIG. 16 illustrates an embodiment of a layout of front optical elements of an LED luminaire according to the disclosure.

FIG. 16 shows an embodiment of a layout 160 of front optical elements of the LED luminaire 302. In FIG. 15, there is a front lens 132 which forms the final output lens of the system. FIG. 16 shows a front view of four of the systems 204 shown in FIG. 15 mounted in a square array. In this embodiment the four optical elements 162, 164, 166, and 168 in FIG. 16 each represent an identical example of lens 132 in FIG. 15. Optical element 162 is constructed as part of a larger, quadrant shaped, structure 172. Structure 172, incorporating optical element 162 may be molded from a single piece of glass or optical plastic. Similarly optical element 164 is incorporated as part of a quadrant 174, optical element 166 is incorporated as part of a quadrant 176, and optical element 168 is incorporated as part of a quadrant 178. The incorporation of the optical elements into quadrants provides two desirable results. Firstly, four modules may be placed in a square array while representing an unbroken and clean appearance from the front with the four quadrants joining to provide a complete circle. Secondly, any remaining spill light from the optical modules will disperse and dissipate within the areas of the quadrants outside the optical elements, providing an attractive light glow between the optical elements.

Figure 17:
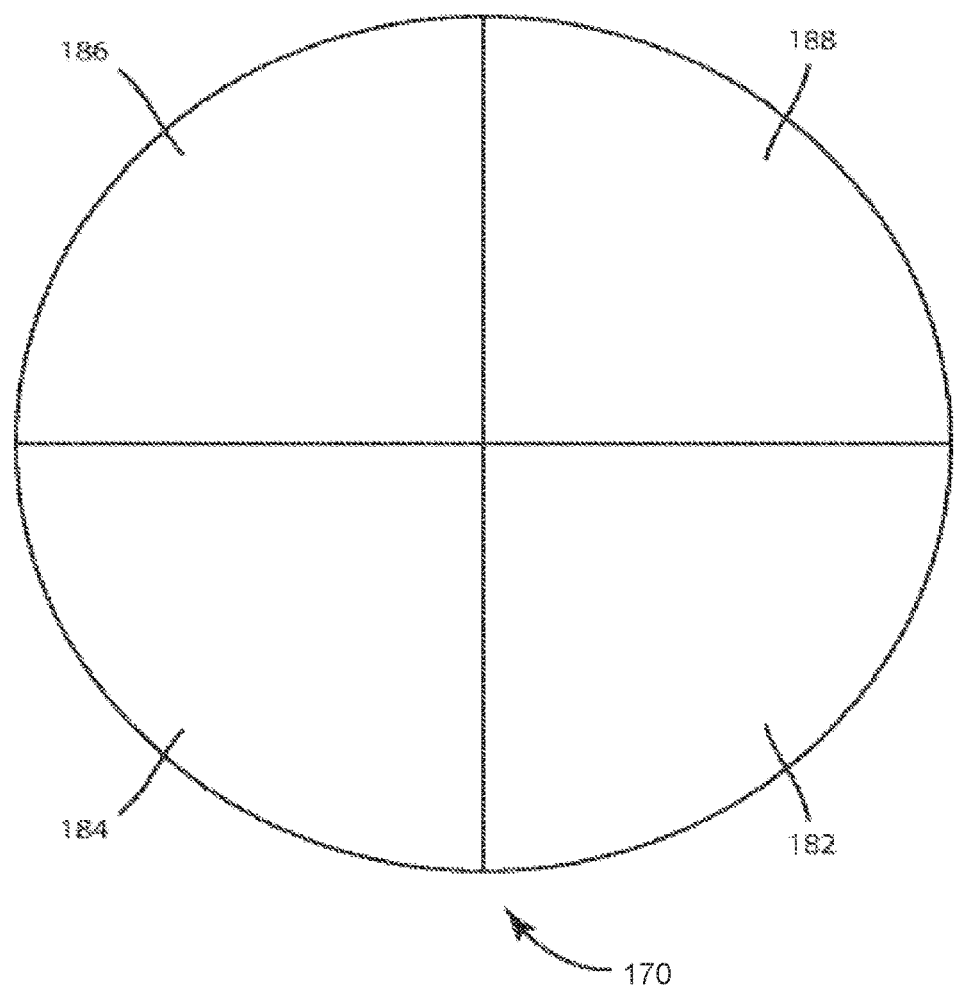
FIG. 17 illustrates a further alternative embodiment of a layout of front optical elements of an LED luminaire according to the disclosure.

FIG. 17 shows a further alternative embodiment of a layout 170 of front optical elements of the LED luminaire 302. In, for example FIG. 15, there is a front lens 132 which forms the final output lens of the system. FIG. 16 shows a front view of four of the systems 204 shown in FIG. 15 mounted in a square array. In this embodiment the four optical elements 182, 184, 186, and 188 in FIG. 17 each represent an identical example of lens 132 in FIG. 15 molded into a quadrant shape. The configuration of the optical elements as quadrants provides two desirable results. Firstly, four modules may be placed in a square array while representing an unbroken and clean appearance from the front with the four quadrants joining to provide a complete circle. Secondly, any remaining spill light from the optical modules will disperse and dissipate within the areas of the quadrants outside the optical elements, providing an attractive light glow between the optical elements.

Figure 18:
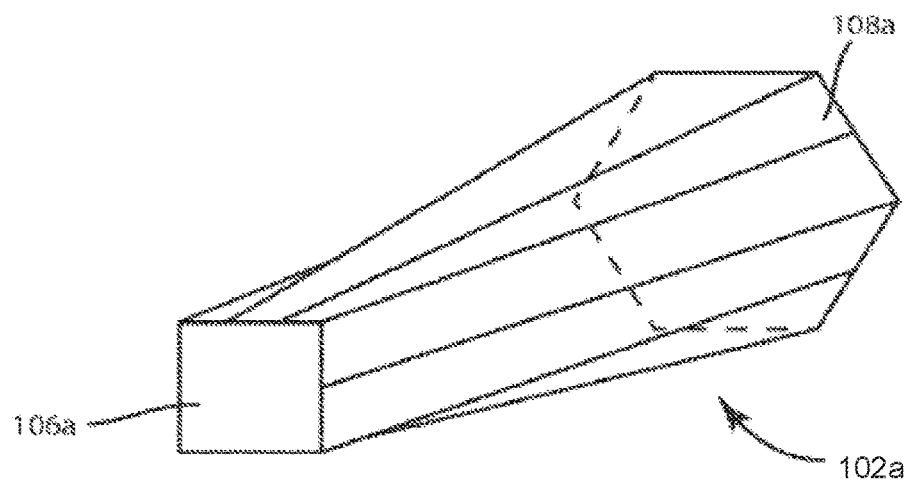
FIG. 18 illustrates an embodiment of a light integrator optic of the disclosure.

FIG. 18 illustrates an embodiment of a light integrator optic 102a of the disclosure. In this embodiment entry port 106a is square in cross-section and exit port 108a is hexagonal in cross-section.

Figure 19:
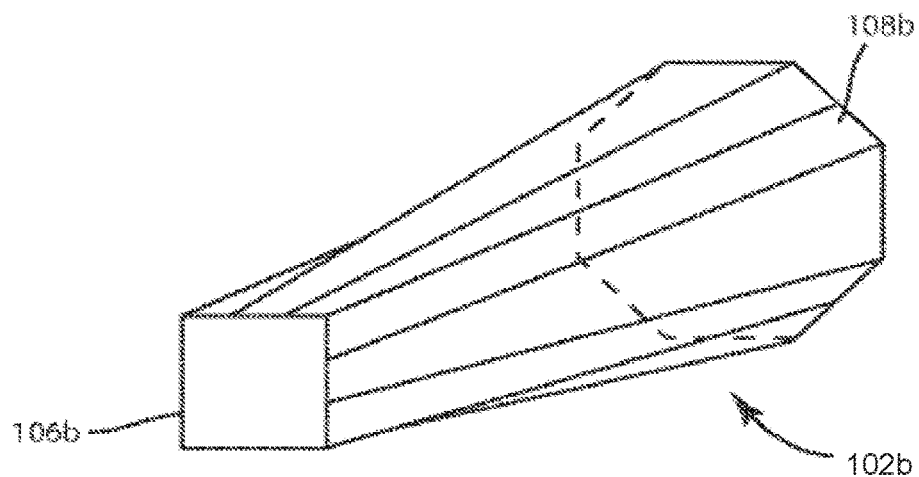
FIG. 19 illustrates an alternative embodiment of a light integrator optic of the disclosure.

FIG. 19 illustrates an alternative embodiment of a light integrator optic 102b of the disclosure. In this embodiment entry port 106b is square in cross-section and exit port 108b is octagonal in cross-section.

Figure 20:
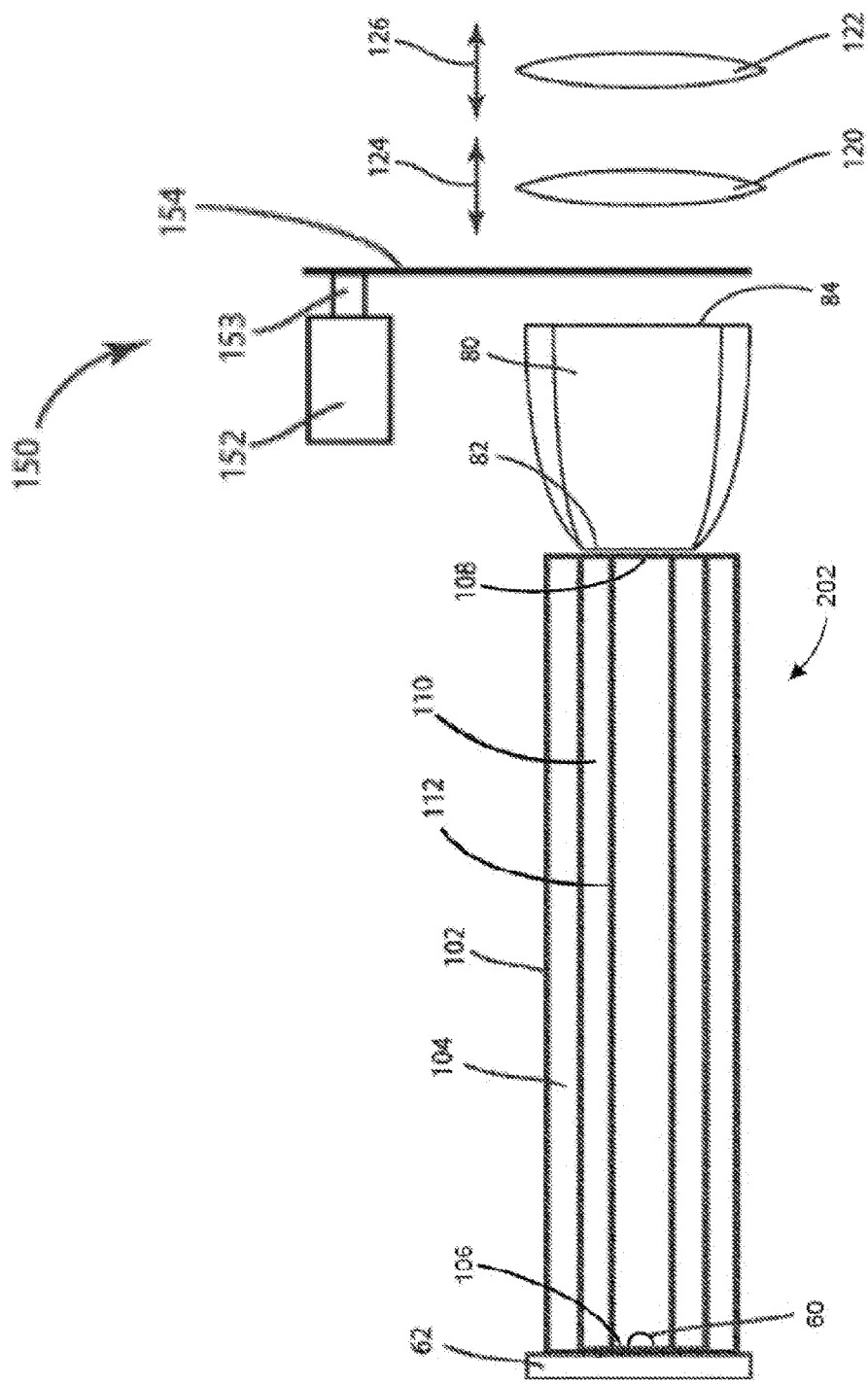
FIG. 20 illustrates an embodiment of a light integrator optic according to the disclosure, fitted with a gobo or pattern wheel.
Figure 21:
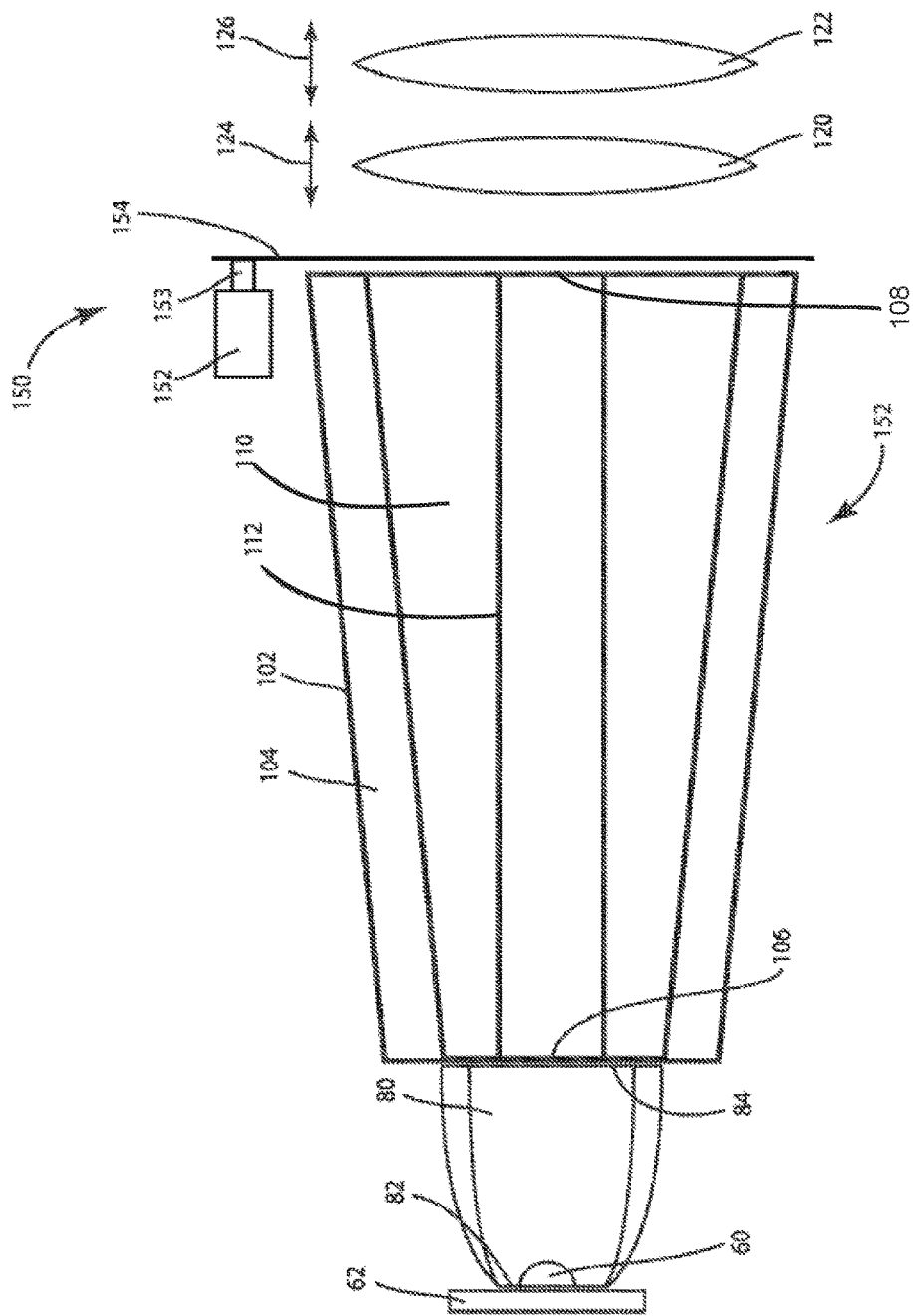
FIG. 21 illustrates an alternative embodiment of a light integrator optic according to the disclosure, fitted with a gobo or pattern wheel.
Figure 22:
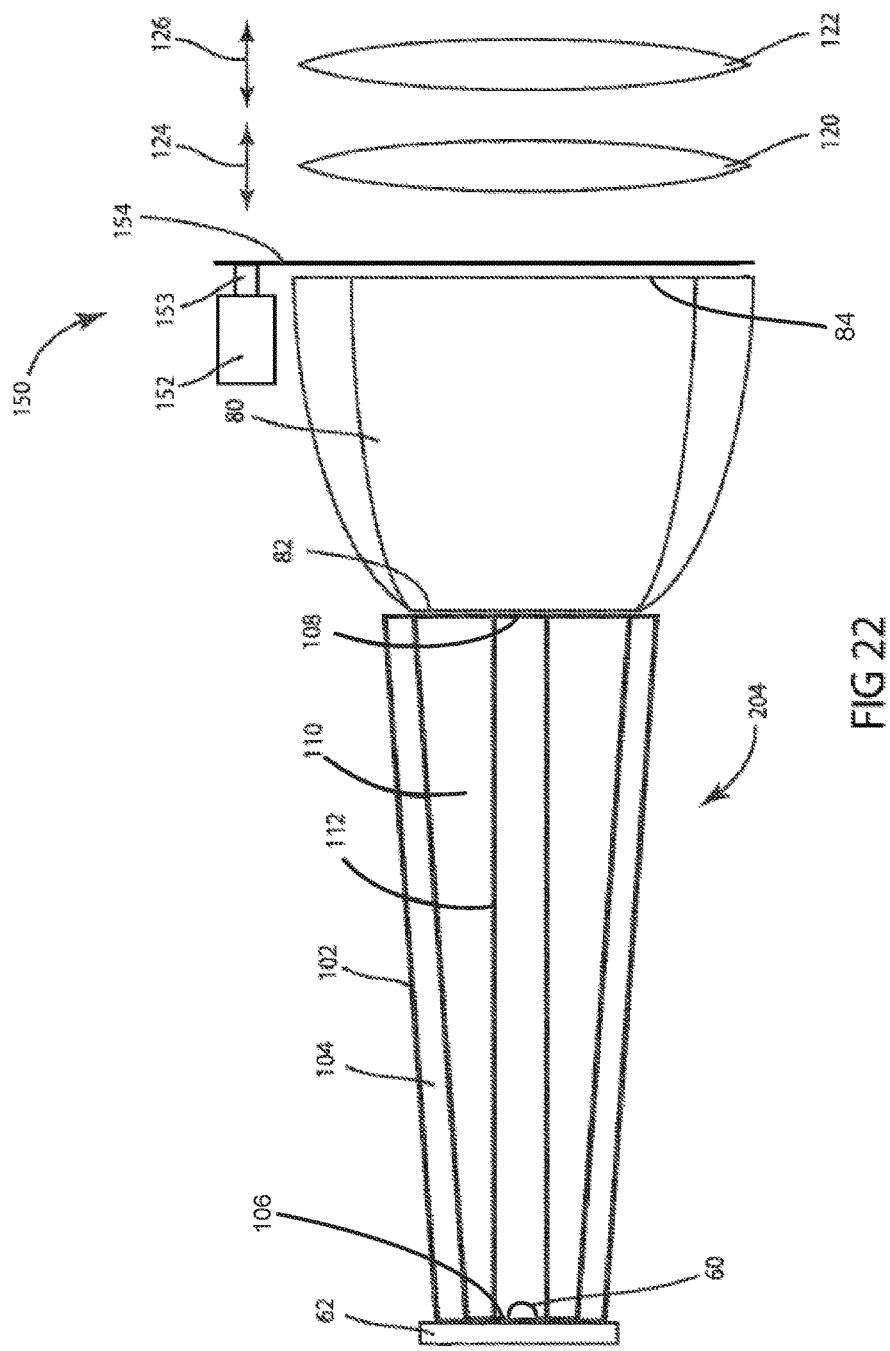
FIG. 22 illustrates an alternative embodiment of a light integrator optic according to the disclosure, fitted with a gobo or pattern wheel.
Figure 23:
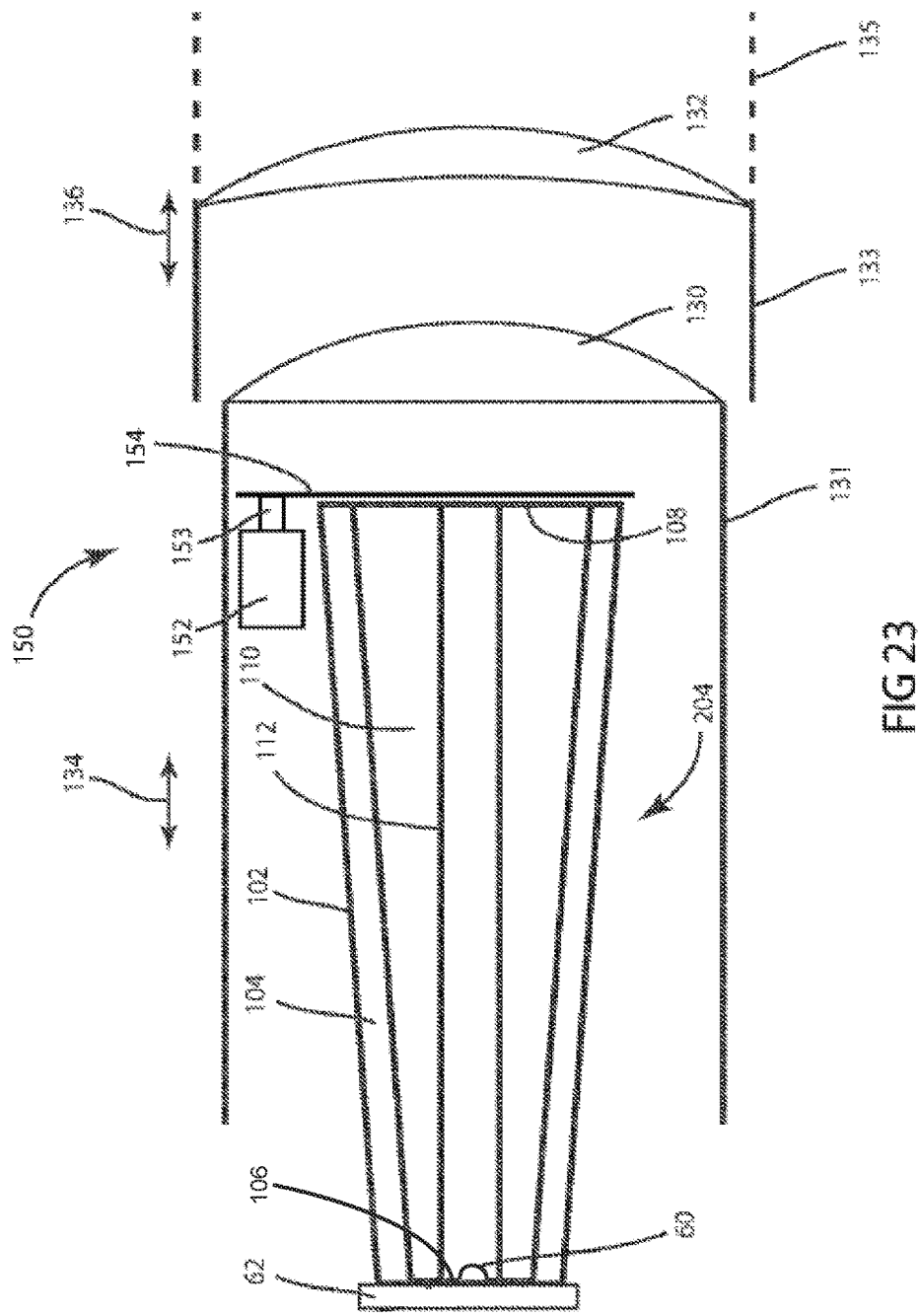
FIG. 23 illustrates an embodiment of a light integrator optic according to the disclosure, fitted with a gobo or pattern wheel.

In the alternative embodiments illustrated in FIGS. 20, 21, 22, and 23 the optical system is further fitted with a gobo wheel system 150. A gobo wheel contains patterns or images that will controllably mask the light exiting through output port 84. These images will then be projected by downstream optical elements to create a pattern projecting light beam. The lens system after the gobo wheel may be a zoom lens system 120 and 122 such as shown in FIG. 20 or any other projecting lens system as well known in the art. Gobo wheel 154 may be rotated through motor 152 and shaft 153 in order to select different gobo patterns in front of output port 84. Gobo wheel system 150 may incorporate a static gobo wheel, a rotating gobo wheel, or both. The static gobo wheel or rotating gobo wheel may each be a full wheel, or a partial wheel.

Figure 24:
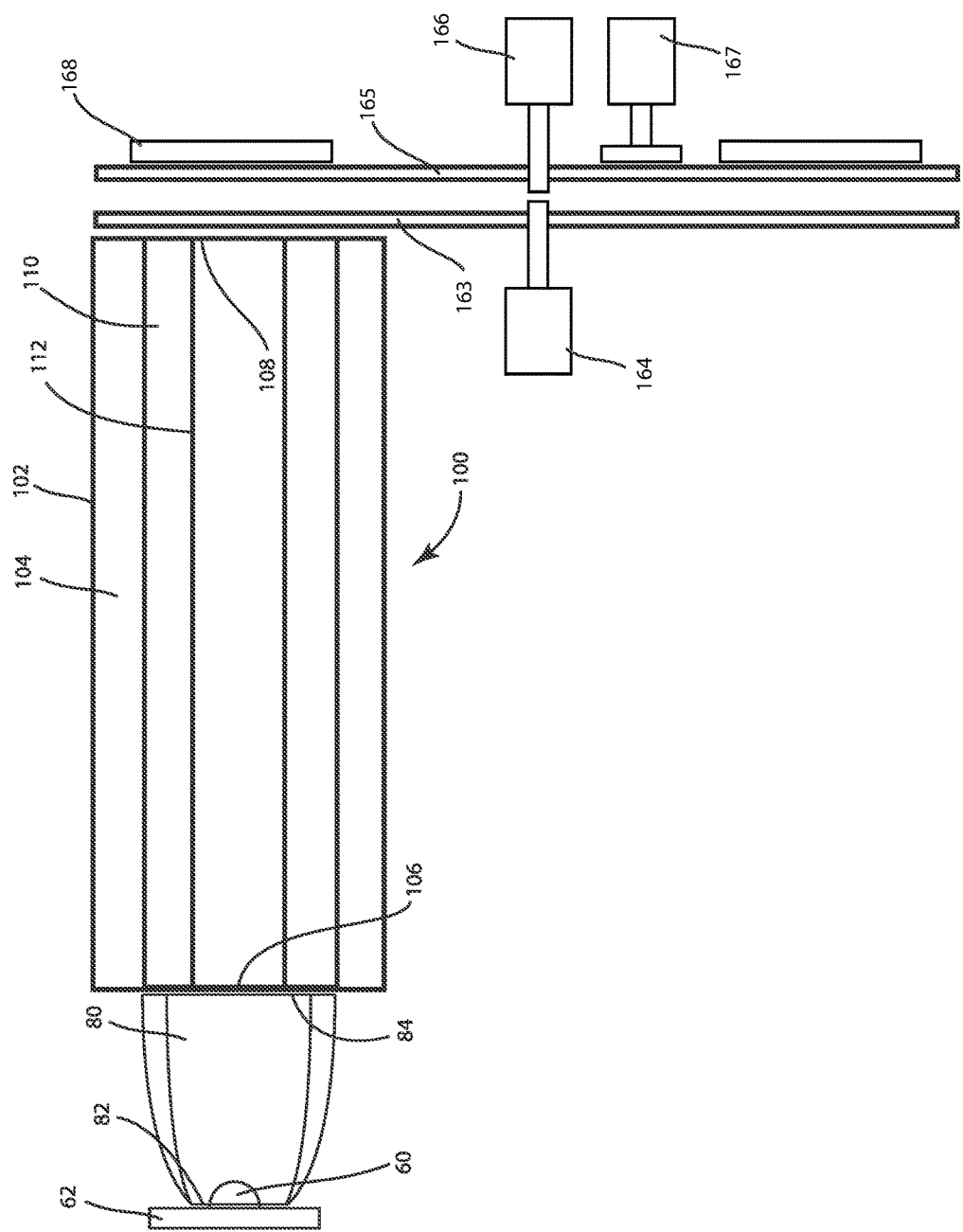
FIG. 24 illustrates both a static gobo wheel and a full rotating gobo wheel as fitted to an embodiment of the disclosure.

FIG. 24 illustrates both a full static gobo wheel and a full rotating gobo wheel as fitted to an embodiment of the disclosure. Gobo wheel 163 may be rotated through motor 164 in order to select different gobo patterns in front of exit port 108. In yet further embodiments, individual gobo patterns may be further rotated about their axes by supplementary motors in order to provide a moving rotating image. Such rotating gobo wheels are well known in the art. Rotating gobo wheel 165 is an example of such an embodiment. Rotating gobo wheel 165 may be rotated through motor 166 in order to select different gobo patterns 168 in front of exit port 108. Gobo patterns 168 may then be rotated about the optical axis of the system through motor 167.

Figure 25:
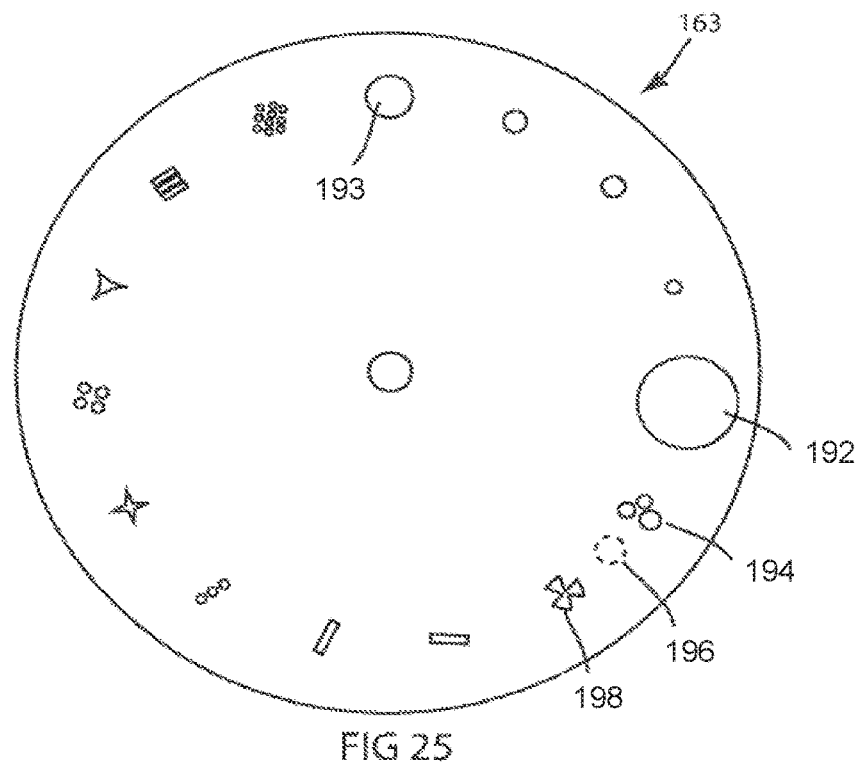
FIG. 25 shows a full static gobo wheel in more detail in a further embodiment of the disclosure.
Figure 26:
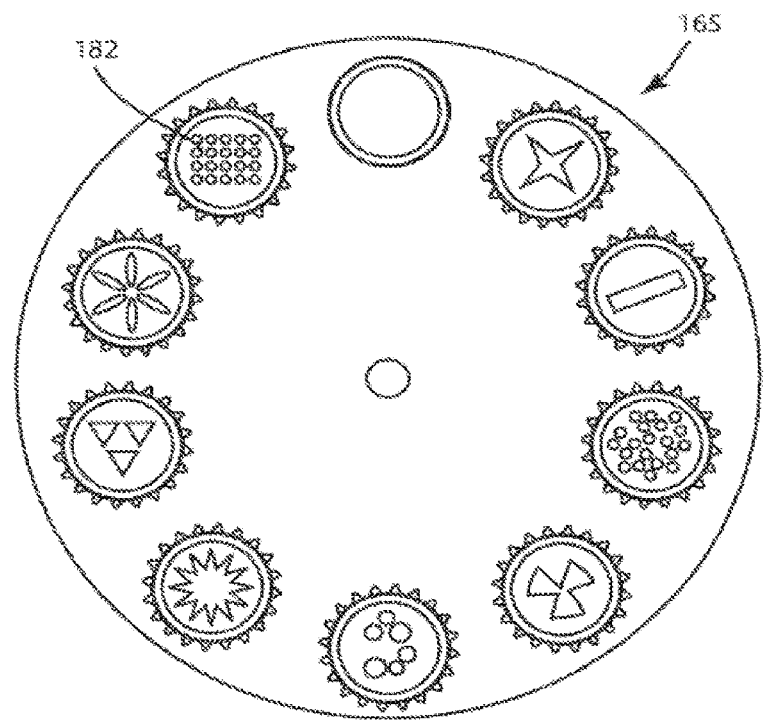
FIG. 26 shows a full rotating gobo wheel in more detail in a further embodiment of the disclosure.
Figure 27:
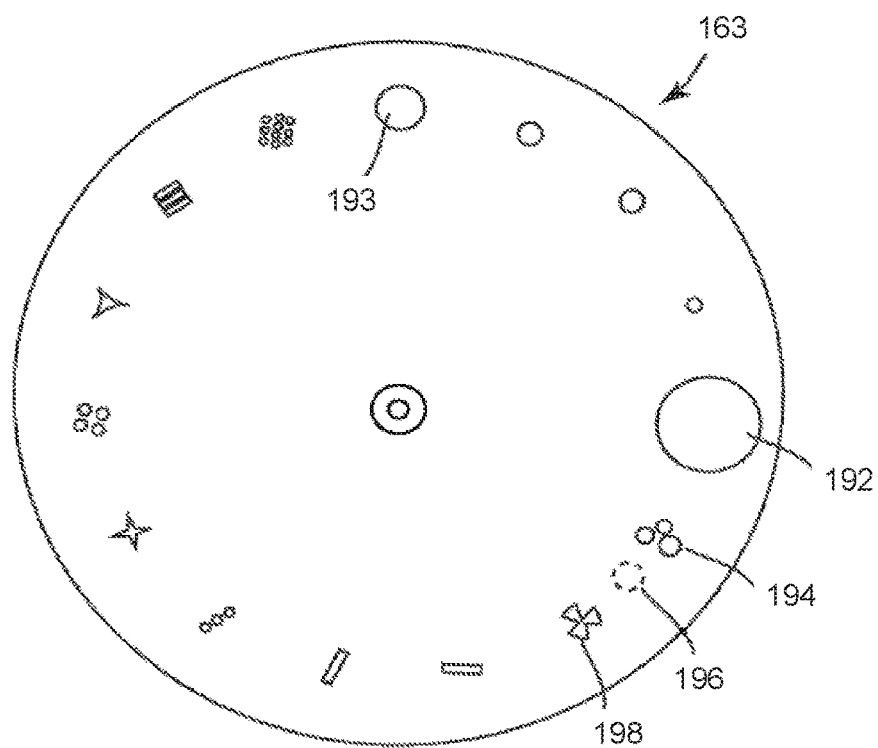
FIG. 27 shows a full static gobo wheel in more detail in a further embodiment of the disclosure.

FIG. 25 shows gobo wheel 163 in more detail in a further embodiment of the disclosure. Gobo wheel 163 contains a plurality of patterns including, for example, 192, 193, 194, 196, and 198 that may be moved across and in front of the exit port of the light integrator by rotation about motor 164. FIG. 26 shows rotating gobo wheel 165 in more detail in a further embodiment of the disclosure. Rotating gobo wheel 165 contains a plurality of patterns including, for example, a pattern 182 that may be moved across and in front of the exit port of the light integrator by rotation about motor 166. These gobo patterns may then be rotated about the optical axis of the system through motor 167. FIG. 27 shows gobo wheel 163 in more detail in a further embodiment of the disclosure. Gobo wheel 163 contains a plurality of patterns including, for example, 192, 193, 194, 196, and 198 that may be moved across and in front of the exit port of the light integrator by rotation about motor 164.

Figure 28:
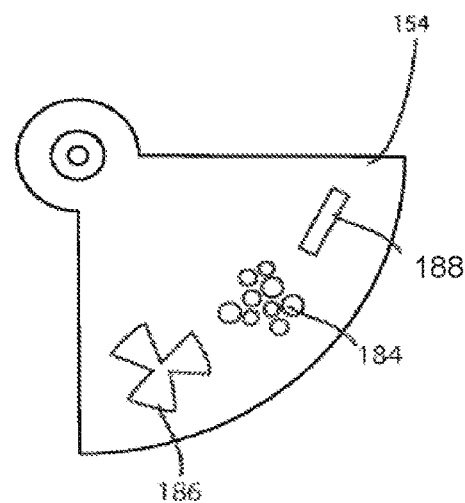
FIG. 28 illustrates an embodiment of a partial static gobo wheel.
Figure 29:
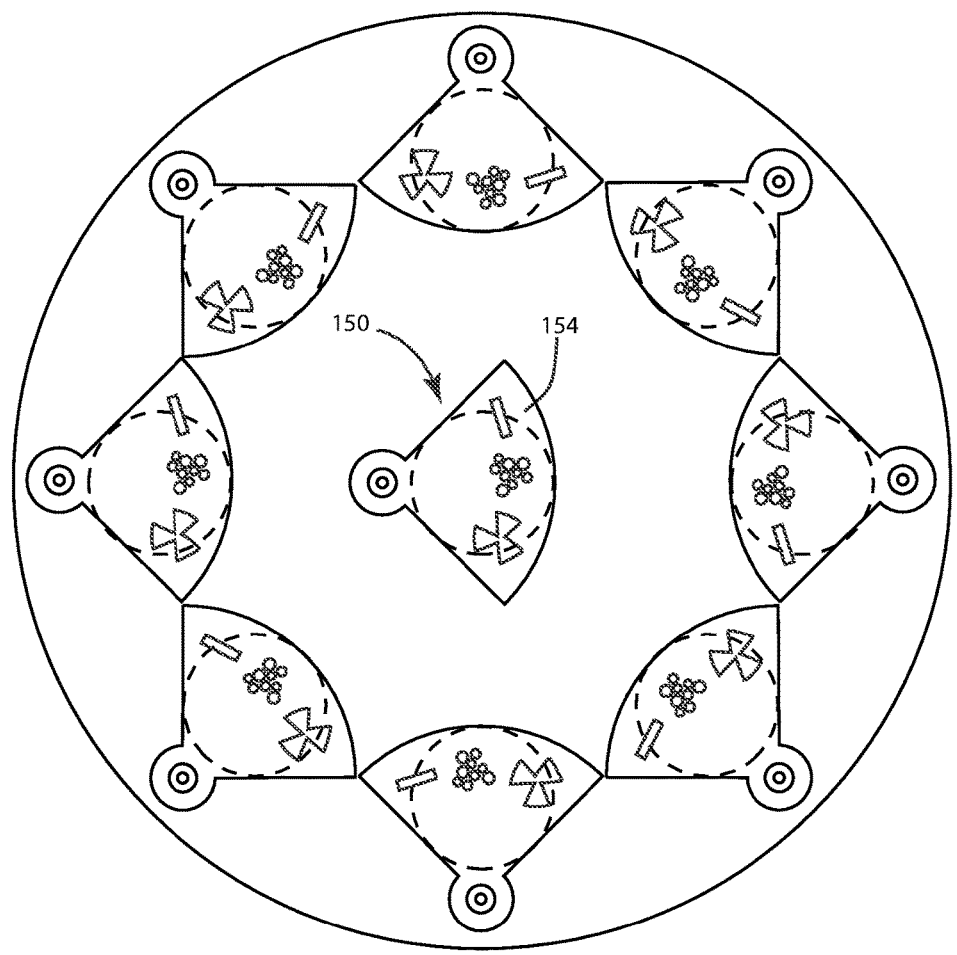
FIG. 29 illustrates an embodiment of an array of light integrators of the disclosure, each fitted with a partial gobo wheel.

In further embodiments the gobo wheel may not be a complete circular disc as shown in FIG. 27, but may be a portion of a disc, or a flag so as to save space and provide a more limited number of gobo options. FIG. 28 illustrates an embodiment of a partial static gobo wheel 154, which is a quadrant of a circle containing three gobo patterns 184, 186, and 188. Such an arrangement with partial wheel 154 facilitates embodiments such as that illustrated in FIG. 29 where multiple light integrators are utilized in a single luminaire. Each of those light integrators may be fitted with an independent gobo system 150 comprising a partial gobo wheel 154, all or any of which may be individually or cooperatively controlled. Utilizing partial gobo wheels 154 may allow a tighter packing density for the light integrators and optical systems without interference between the adjacent wheels. In the example illustrated, nine light integrators and associated gobo systems 150 are utilized in a circular arrangement. However, the disclosure is not so limited and any number of light integrators in any arrangement may be utilized without departing from the spirit of the disclosure. Additionally, it is not necessary that every light integrator is fitted with a gobo system; embodiments may be constructed where a proportion of the light integrators are fitted with gobo systems, and a proportion are not.

Figure 30:
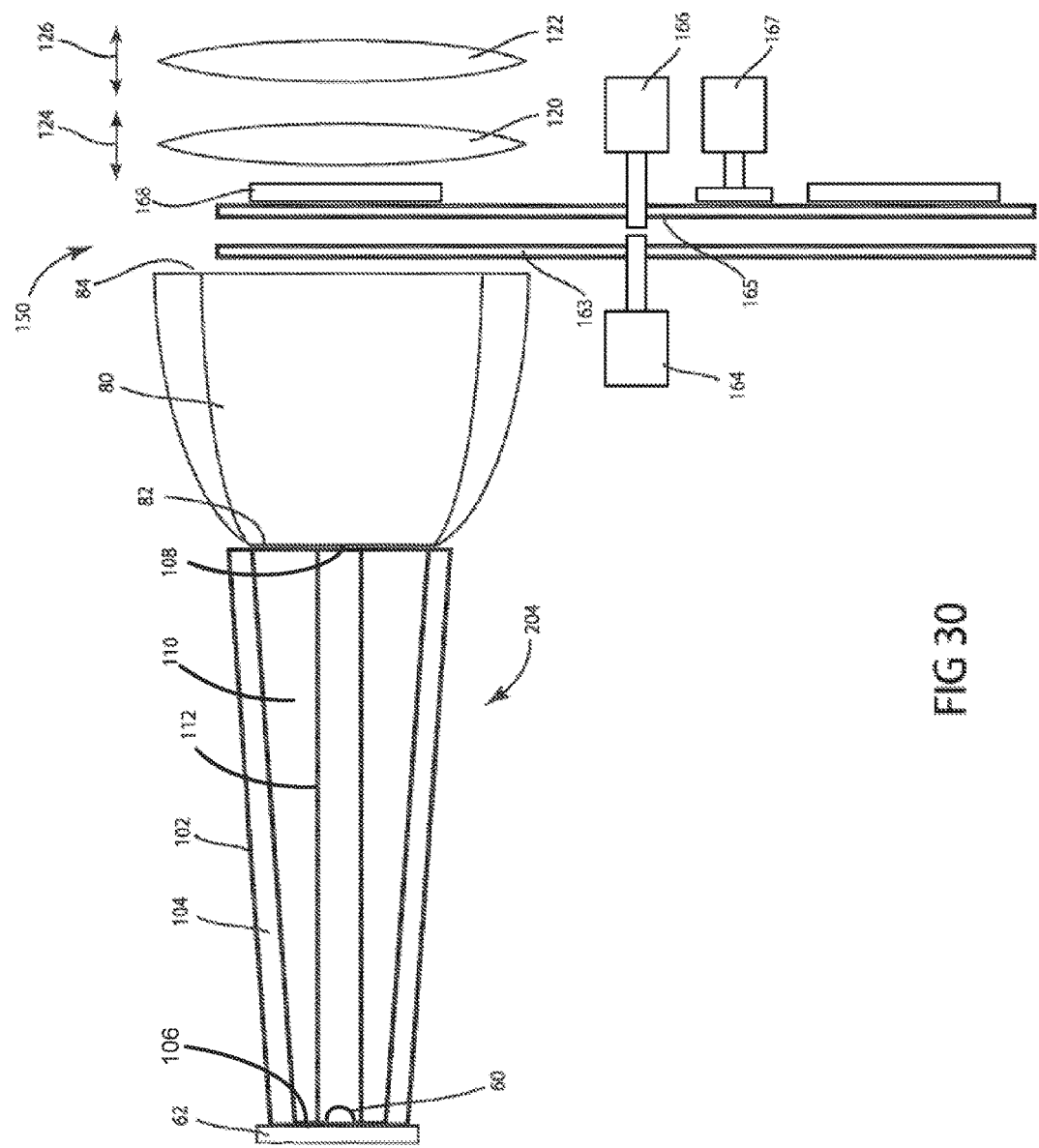
FIG. 30 illustrates an alternative embodiment of the disclosure, fitted with a full static gobo wheel and a full rotating gobo wheel.

FIG. 30 illustrates both a full static gobo wheel and a full rotating gobo wheel as fitted as gobo wheel system 150 in an alternative embodiment of the disclosure. Gobo wheel 163 may be rotated through motor 164 in order to select different gobo patterns in front of output port 84. In yet further embodiments, individual gobo patterns may be further rotated about their axes by supplementary motors in order to provide a moving rotating image. Such rotating gobo wheels are well known in the art. Rotating gobo wheel, 165, is an example of such an embodiment. Rotating gobo wheel 165 may be rotated through motor 166 in order to select different gobo patterns 168 in front of output port 84. Gobo patterns 168 may then be rotated about the optical axis of the system through motor 167.

Figure 31:
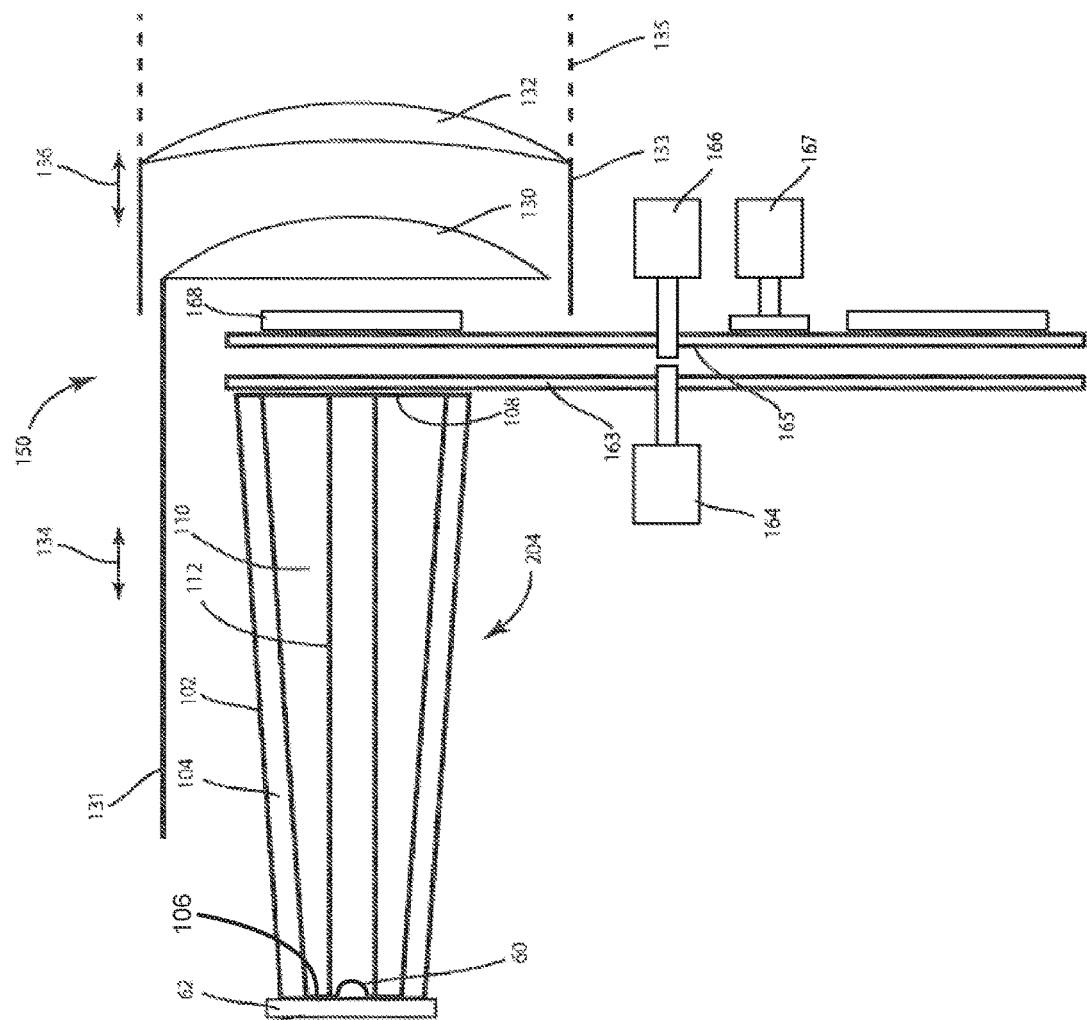
FIG. 31 illustrates a preferred embodiment of the disclosure, fitted with a full static gobo wheel and a full rotating gobo wheel.

FIG. 31 illustrates both a full static gobo wheel and a full rotating gobo wheel as fitted as gobo wheel system 150 in a preferred embodiment of the disclosure. Gobo wheel 163 may be rotated through motor 164 in order to select different gobo patterns in front of exit port 108. In yet further embodiments, individual gobo patterns may be further rotated about their axes by supplementary motors in order to provide a moving rotating image. Such rotating gobo wheels are well known in the art. Rotating gobo wheel 165 is an example of such an embodiment. Rotating gobo wheel 165 may be rotated through motor 166 in order to select different gobo patterns 168 in front of exit aperture 108. Gobo patterns 168 may then be rotated about the optical axis of the system through motor 167.

In all embodiments both the static and rotating gobo patterns may be of any shape and may include colored images or transparencies. Additionally effects such as prisms, lenticular lenses, or break up glasses may be used without departing from the spirit of the disclosure. For example, the use of a lenticular lens may provide an elliptical beam from each light integrator and rotating that lenticular lens may rotate the elliptical beam about its optical axis. Cooperatively or independently rotating such lenticular lenses on a luminaire with multiple light integrators such as that illustrated in FIG. 29, may provide new dynamic lighting effects for the operator.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. An automated luminaire comprising:
a light-emitting diode (LED) source comprising multiple LEDs;
an elongated light integrator, the LED source positioned to emit light into the elongated light integrator, the elongated light integrator configured to internally reflect the light to homogenize the light;
a gobo carrier configured to receive homogenized light from the elongated light integrator, the gobo carrier comprising a set of gobo patterns; and
lenses positioned to receive light passed through the gobo carrier, a first lens coupled to a first light-spill reducing element extending from the first lens toward the LED source, a second lens coupled to a second light-spill reducing element extending from the second lens toward the LED source,
the first light-spill reducing element is positioned within the second light-spill reducing element, and
a distance between each lens and the LED source is adjustable, and each light-spill reducing element is configured to move with the associated lens.

2. The automated luminaire of claim 1, wherein the second lens is one of four lenses arranged in a square array.

3. The automated luminaire of claim 1, wherein the elongated light integrator comprises a square input cross-section and a hexagonal output cross-section.

4. The automated luminaire of claim 1, wherein the elongated light integrator is a solid optic using total internal reflection (TIR) to internally reflect the light.

5. The automated luminaire of claim 1, wherein the gobo carrier is a gobo wheel.

6. The automated luminaire of claim 5 further comprising a motor coupled to the gobo wheel, the motor configured to rotate the gobo wheel to position a selected gobo pattern from the set of gobo patterns in the homogenized light received from the elongated light integrator.

7. The automated luminaire of claim 6, wherein the motor is coupled to a control system.

8. The automated luminaire of claim 1, wherein the gobo carrier comprises a plurality of gobo carriers.

9. The automated luminaire of claim 1, wherein the elongated light integrator is tapered to provide a divergence angle of light exiting the elongated light integrator that is less than a divergence angle for light entering the elongated light integrator.

10. An automated luminaire comprising:
light-emitting diode (LED) sources, each LED source comprising multiple LEDs;
a first elongated light integrator;
a second elongated light integrator;
a first LED source positioned to emit light into the first elongated light integrator, the first elongated light integrator configured to internally reflect the light to homogenize the light;
a second LED source positioned to emit light into the second elongated light integrator, the second elongated light integrator configured to internally reflect the light to homogenize the light;
a first gobo carrier configured to receive homogenized light from the first elongated light integrator, the first gobo carrier comprising a first set of gobo patterns;
a second gobo carrier configured to receive homogenized light from the second elongated light integrator, the second gobo carrier comprising a second set of gobo patterns;
a first set of lenses positioned to receive light passed through the first gobo carrier, wherein a first lens of the first set of lenses is coupled to a first light-spill reducing element extending toward the first LED source, wherein a second lens of the first set of lenses is coupled to a second light-spill reducing element extending toward the first LED source; and
a second set of lenses positioned to receive light passed through the second gobo carrier, wherein a first lens of the second set of lenses is coupled to a third light-spill reducing element extending toward the second LED source, wherein a second lens of the second set of lenses is coupled to a fourth light-spill reducing element extending toward the second LED source,
the first light-spill reducing element positioned within the second light-spill reducing element,
the third light-spill reducing element positioned within the fourth light-spill reducing element, and
a distance between each lens and each LED source is adjustable, and the light-spill reducing elements are configured to move with the associated lenses.

11. The automated luminaire of claim 10, wherein each second lens is one of four lenses arranged in a square array.

12. The automated luminaire of claim 10, wherein each elongated light integrator is tapered to provide a divergence angle of light exiting each elongated light integrator that is less than a divergence angle for light entering each elongated light integrator.

13. An automated luminaire comprising:
a light-emitting diode (LED) source;
an elongated light integrator, wherein the LED source is positioned to emit light into the elongated light integrator, the elongated light integrator configured to internally reflect the light and emit a homogenized light beam;
a gobo carrier configured to receive the homogenized light beam, the gobo carrier comprising a set of gobo patterns;
lenses positioned to receive the homogenized light beam from the gobo carrier, a first lens being coupled to a first light-spill reducing element extending toward the LED source and configured to move with the first lens, a second lens coupled to a second light-spill reducing element extending toward the LED source and configured to move with the second lens, the first light-spill reducing element being positioned within the second light-spill reducing element; and
control electronics configured to individually move the first and second lenses to adjust respective distances between each lens and the LED source.

14. The automated luminaire of claim 13, wherein the second lens is one of four lenses arranged in a square array.

15. The automated luminaire of claim 13, wherein the gobo carrier comprises a gobo wheel.

16. The automated luminaire of claim 15, further comprising a motor coupled to the gobo wheel, the control electronics configured to rotate the gobo wheel to position a selected gobo pattern from the set of gobo patterns in the homogenized light beam.

17. The automated luminaire of claim 13, wherein:
the gobo carrier comprises a static gobo wheel comprising a first set of gobo patterns and a rotating gobo wheel comprising a second set of gobo patterns.

18. The automated luminaire of claim 17, wherein the control electronics are configured to:
- rotate the static gobo wheel to position a first selected gobo pattern from the first set of gobo patterns in the homogenized light beam; and
- rotate the rotating gobo wheel to position a second selected gobo pattern from the second set of gobo patterns in the homogenized light beam and rotate the second selected gobo pattern in the homogenized light beam.

19. The automated luminaire of claim 18, wherein the static gobo wheel is configured to receive the homogenized light beam from the elongated light integrator and the rotating gobo wheel is configured to receive the homogenized light beam from the static gobo wheel.

* * * * *

UNITED STATES PATENT AND TRADEMARK OFFICE
CERTIFICATE OF CORRECTION

PATENT NO. : 10,330,293 B2
APPLICATION NO. : 15/516397
DATED : June 25, 2019
INVENTOR(S) : Pavel Jurik et al.

Page 1 of 1

It is certified that error appears in the above-identified patent and that said Letters Patent is hereby corrected as shown below:

In the Specification

Column 1, Line 13 replace "Serim" with --Scrim--

Signed and Sealed this
Tenth Day of September, 2019

Andrei Iancu
*Director of the United States Patent and Trademark Office*